US012720597B2

(12) United States Patent
Stefanatos et al.

(10) Patent No.: US 12,720,597 B2
(45) Date of Patent: Aug. 25, 2026

(54) CHANNEL OCCUPANCY TIME (COT) SHARING FOR SIDELINK COMMUNICATIONS IN UNLICENSED BAND

(71) Applicant: QUALCOMM Incorporated, San Diego, CA (US)

(72) Inventors: Stelios Stefanatos, San Diego, CA (US); Shuanshuan Wu, San Diego, CA (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/255,480

(22) PCT Filed: Feb. 7, 2022

(86) PCT No.: PCT/US2022/015435
§ 371 (c)(1),
(2) Date: Jun. 1, 2023

(87) PCT Pub. No.: WO2022/182502
PCT Pub. Date: Sep. 1, 2022

(65) Prior Publication Data

US 2024/0008085 A1 Jan. 4, 2024

(30) Foreign Application Priority Data

Feb. 24, 2021 (GR) .............................. 20210100111
Mar. 31, 2021 (GR) .............................. 20210100218

(51) Int. Cl.
*H04W 74/0816* (2024.01)
*H04B 17/318* (2015.01)
*H04L 5/00* (2006.01)

(52) U.S. Cl.
CPC ...... *H04W 74/0816* (2013.01); *H04B 17/328* (2023.05); *H04L 5/0053* (2013.01)

(58) Field of Classification Search
CPC ........... H04W 74/0816; H04W 74/002; H04W 74/0808; H04W 92/18; H04B 17/328;
(Continued)

(56) References Cited

U.S. PATENT DOCUMENTS

2021/0314966 A1* 10/2021 Hui ........................ H04W 72/56
2022/0240260 A1* 7/2022 Zhou ..................... H04W 72/25
(Continued)

FOREIGN PATENT DOCUMENTS

EP 3675529 A1 7/2020
EP 3890417 A1 10/2021

OTHER PUBLICATIONS

International Search Report and Written Opinion—PCT/US2022/015435—ISA/EPO—May 17, 2022.
(Continued)

*Primary Examiner* — Edan Orgad
*Assistant Examiner* — Malick A Sohrab
(74) *Attorney, Agent, or Firm* — Harrity & Harrity, LLP

(57) ABSTRACT

Wireless communications systems and methods related to channel occupancy time (COT) sharing for sidelink communications in unlicensed bands are provided. A method for wireless communication by a first user equipment (UE) may include measuring a first reference signal received power (RSRP) of a physical sidelink feedback channel (PSFCH) transmission transmitted during a channel occupancy time (COT) initiated by a second UE and accessing a first slot of the COT based on the first RSRP.

30 Claims, 19 Drawing Sheets

700

Measure a first reference signal received power (RSRP) of a physical sidelink feedback channel (PSFCH) transmission transmitted during a channel occupancy time (COT) initiated by a second UE — 710

Access a first slot of the COT based on the first RSRP — 720

(58) Field of Classification Search
CPC ....... H04L 5/0053; H04L 1/1861; H04L 1/20; H04L 1/1812
See application file for complete search history.

(56) References Cited

U.S. PATENT DOCUMENTS

| | | | | |
|---|---|---|---|---|
| 2023/0129493 | A1* | 4/2023 | Kiilerich Pratas | H04L 5/0057 370/235 |
| 2023/0146718 | A1* | 5/2023 | Lei | H04W 74/0808 370/329 |
| 2023/0371073 | A1* | 11/2023 | Liu | H04W 74/0816 |

OTHER PUBLICATIONS

Sony: "Resource Allocation Mechanism for NR Sidelink Mode 2", 3GPP Draft, 3GPP TSG RAN WG1 #100-e, R1-2000583, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Jun. 3, 2020 Feb. 14, 2020 (Feb. 14, 2020), XP051852928, 3 Pages.

* cited by examiner

700

1000
910a
920a
1012
Data Source
1020
Transmit Processor
1030
TX MIMO Processor
1032a
MOD
DEMOD
1034a
1032t
1034t
1040
Controller/ Processor
1042
Memory
1044
Scheduler
1036
MIMO Detector
1038
Receive Processor
1039
Data Sink
1052a
1054a
DEMOD
MOD
1052r
1054r
1056
MIMO Detector
1058
Receive Processor
1060
Data Sink
1080
Controller/ Processor
1081
COT Manager
1082
Memory
1062
Data Source
1064
Transmit Processor
1066
TX MIMO Processor

CHANNEL OCCUPANCY TIME (COT) SHARING FOR SIDELINK COMMUNICATIONS IN UNLICENSED BAND

CROSS REFERENCE TO RELATED APPLICATION

The present application is a 35 U.S.C. 371 National Phase entry of Patent Cooperation Treaty (PCT) Application No. PCT/US2022/015435, filed Feb. 7, 2022, which claims priority to and the benefit of Greek Patent Application No. 20210100218, filed Mar. 31, 2021, titled ACK TRANSMISSION FOR IMPROVED COT SHARING and Greek Patent Application No. 20210100111 filed Feb. 24, 2021, titled CHANNEL OCCUPANCY TIME (COT) SHARING FOR SIDELINK COMMUNICATIONS IN UNLICENSED BANDS, both of which are hereby incorporated by reference in their entireties as if fully set forth below and for all applicable purposes.

TECHNICAL FIELD

This application relates to wireless communication systems, and more particularly to channel occupancy time (COT) sharing for sidelink communications in unlicensed bands.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BS s), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5$^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects of the disclosure, a method of wireless communication performed by a first user equipment (UE) comprises measuring a first reference signal received power (RSRP) of a physical sidelink feedback channel (PSFCH) transmission transmitted during a channel occupancy time (COT) initiated by a second UE; and accessing a first slot of the COT based on the first RSRP.

In some aspects, a method of wireless communication performed by a first user equipment (UE) comprises detecting a physical sidelink shared channel (PSSCH) transmission; detecting, within a COT having a plurality of slots, a physical sidelink feedback channel (PSFCH) transmission transmitted in response to the PSSCH transmission; and accessing a first slot of the plurality of slots of the COT based on the detecting the PSFCH transmission.

In some aspects, a first user equipment (UE) comprises a memory and at least one processor operatively coupled to the memory and configured to measure a first reference signal received power (RSRP) of a physical sidelink feedback channel (PSFCH) transmission transmitted during a channel occupancy time (COT) initiated by a second UE; and access a first slot of the COT based on the first RSRP.

In some aspects, a first user equipment (UE) comprises a memory and at least one processor operatively coupled to the memory and configured to: detect a physical sidelink shared channel (PSSCH) transmission; detect, within a COT having a plurality of slots, a physical sidelink feedback channel (PSFCH) transmission transmitted in response to the PSSCH transmission; and access a first slot of the plurality of slots of the COT based on the detecting the PSFCH transmission.

In some aspects, a non-transitory computer-readable medium (CRM) has program code recorded thereon, the program code comprising: code for causing a first user equipment (UE) to measure a first reference signal received power (RSRP) of a physical sidelink feedback channel (PSFCH) transmission transmitted during a channel occupancy time (COT) initiated by a second UE; and code for causing the first UE to access a first slot of the COT based on the first RSRP.

In some aspects, a non-transitory computer-readable medium (CRM) has program code recorded thereon, the program code comprising: code for causing a first user equipment (UE) to detect a physical sidelink shared channel (PSSCH) transmission; code for causing a first user equipment (UE) to detect, within a COT having a plurality of slots, a physical sidelink feedback channel (PSFCH) transmission transmitted in response to the PSSCH transmission; and code for causing a first user equipment (UE) to access a first slot of the plurality of slots of the COT based on the detecting the PSFCH transmission.

In some aspects, a first user equipment (UE) comprises means for a first reference signal received power (RSRP) of a physical sidelink feedback channel (PSFCH) transmission transmitted during a channel occupancy time (COT) initiated by a second UE; and means for accessing a first slot of the COT based on the first RSRP.

In some aspects, a first user equipment (UE) comprises means for detecting a physical sidelink shared channel (PSSCH) transmission; means for detecting, within a COT having a plurality of slots, a physical sidelink feedback channel (PSFCH) transmission transmitted in response to the PSSCH transmission; and means for accessing a first slot of the plurality of slots of the COT based on the detecting the PSFCH transmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
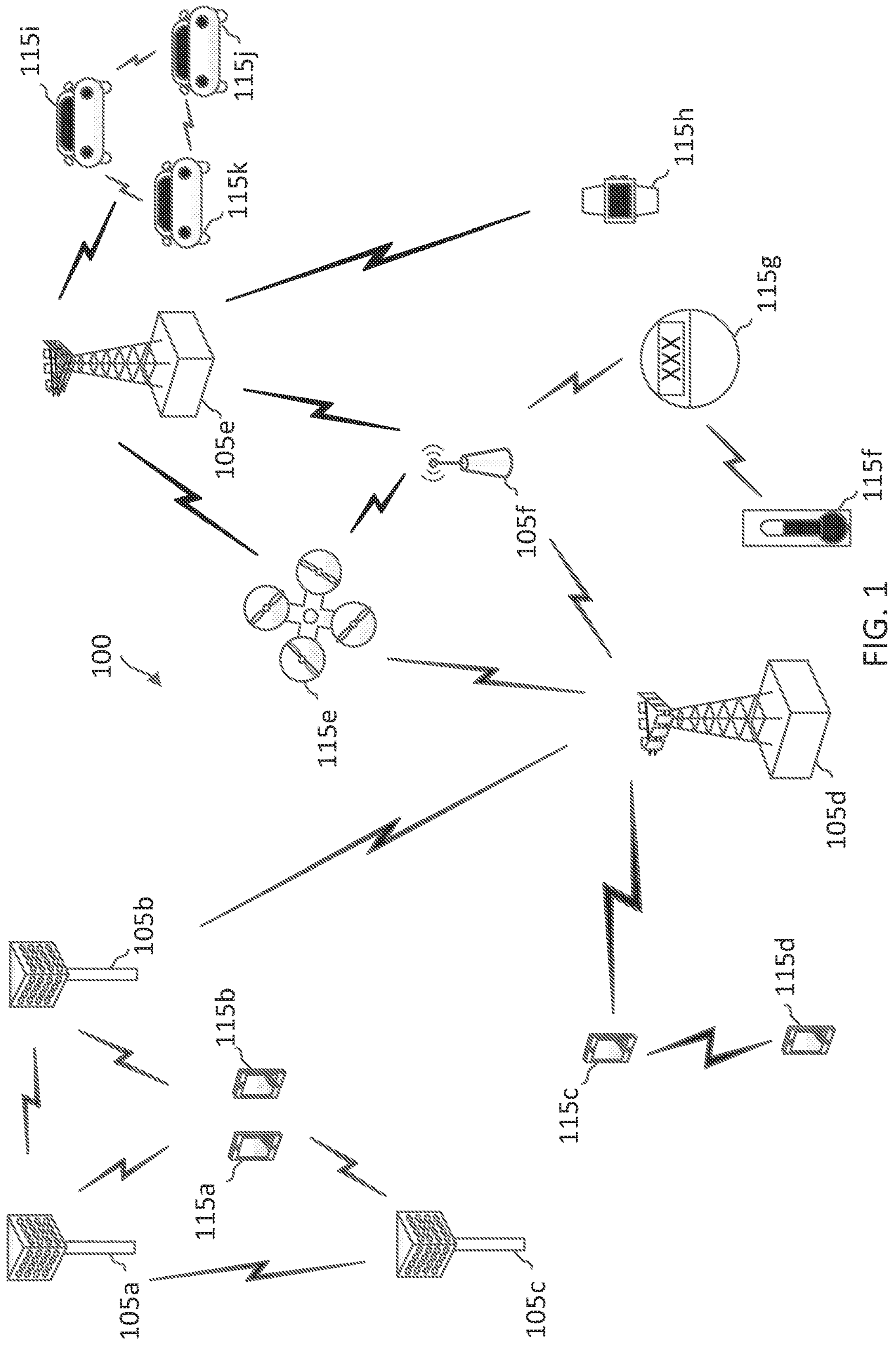
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some implementations, the SCI in the PSCCH may referred to as SCI part 1 (SCI-1), and additional SCI, which may be referred to as SCI part 2 (SCI-2) may be carried in the PSSCH. The SCI-2 can include control information (e.g., transmission parameters, modulation coding scheme (MCS)) that are more specific to the data carrier in the PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and operate as a receiving sidelink UE at another time.

As used herein, the term "initiating UE" can refer to a user equipment device initiating or acquiring a channel occupancy time (COT) in a shared radio frequency band (e.g., in a shared spectrum or an unlicensed spectrum) for sidelink communication. For instance, the initiating UE may perform a clear channel assessment (CCA) or a category 4 (CAT4) listen-before-talk (LBT) in the shared radio frequency band to contend or acquire the COT. Upon passing the LBT (indicating the channel is clear for transmission), the initiating UE may transmit a sidelink transmission during the acquired COT. As used herein, the term "responding UE" can refer to a user equipment device responding to a sidelink transmission transmitted by any initiating UE. A sidelink UE may operate as an initiating UE at one time and operate as a responding UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). For this mode, however, there is significant base station involvement and is only operable when the sidelink UE is within the coverage area of the serving BS. The mode-2 RRA supports autonomous RRA that can be used for out-of-coverage sidelink UEs or partial-coverage sidelink UEs. For instance, a serving BS may configure a sidelink UE (e.g., while in coverage of the serving BS) with sidelink resource pools which may be used for sidelink when the sidelink UE is out of the coverage of the serving BS. A sidelink channel where two UEs may communicate with each other directly may also be referred to as a PC5 interface in 5G NR.

A sidelink communication can be in a unicast mode, a groupcast mode, or a broadcast mode. Additionally, hybrid automatic repeat request (HARQ) can be applied to a unicast or a groupcast sidelink communication to improve transmission reliability. For unicast communication, a sidelink transmitting UE may transmit a sidelink transmission including data to a single sidelink receiving UE and may request a HARQ acknowledgement/negative-acknowledgement (ACK/NACK) feedback from the sidelink receiving UE. If the sidelink receiving UE successfully decoded data from the sidelink transmission, the sidelink receiving UE transmits an ACK. Conversely, if the sidelink receiving UE fails to decode data from the sidelink transmission, the sidelink receiving UE transmits an NACK. Upon receiving a NACK, the sidelink transmitting UE may retransmit the data. For broadcast communication, a sidelink transmitting UE may transmit a sidelink transmission to a group of sidelink receiving UEs (e.g., 2, 3, 4, 5, 6 or more) in a neighborhood of the sidelink transmitting UE and may not request for an ACK/NACK feedback for the sidelink transmission.

A groupcast sidelink communication can be connection-based or connectionless. A connection-based groupcast sidelink communication is destined to a specific group of UEs, for example, each belongs to a group identified by a group identifier (ID), and known to the sidelink transmitting to the UE. As such, the sidelink transmitting UE may request an ACK/NACK feedback from each sidelink receiving UE in the group and may also assign each sidelink receiving UE in the group with a different feedback resource. For a connectionless groupcast sidelink communication, the group of UEs that can receive the groupcast transmission may be unknown to the sidelink transmitting UE. As such, the sidelink transmitting UE may request an NACK-only feedback from UEs that received the groupcast sidelink communication (successfully decoded the presence of the SCI), but fails to decode information data from the groupcast sidelink communication. In some instances, the sidelink transmitting UE may also assign the same NACK-only feedback resource to all UEs that failed the data decoding.

The provisioning of sidelink services, such as device-to-device (D2D), vehicle-to-vehicle (V2V), vehicle-to-everything (V2X), and/or cellular vehicle-to-everything (C-V2X) communications, over dedicated spectrum or licensed spectrum are relatively straight-forward as channel access in the dedicated spectrum or licensed spectrum is guaranteed. NR-unlicensed (NR-U) can bring benefit for sidelink services, for example, by offloading sidelink traffic to the unlicensed spectrum at no cost. However, channel access in a shared spectrum or an unlicensed spectrum is not guaranteed. Thus, to provision for sidelink services over a shared spectrum or unlicensed spectrum, sidelink user equipment devices (UEs) are required to contend for channel access in the spectrum, for example, via clear channel assessment (CCA) and/or listen-before-talk (LBT) procedures.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, an initiating UE may contend for a COT in a shared radio frequency band by performing CCA or a CAT4 LBT. Upon passing the CCA or CAT4 LBT (indicating the channel is cleared for transmission), the initiating UE may transmit a sidelink transmission to one or more sidelink receiving UEs during the COT. In some sidelink use cases (e.g., for V2X), sidelink data traffic may include small-sized or short data bursts (e.g., with a few bytes to tens of kilobytes of information data). In some aspects, the duration of a COT may be dependent on regulations imposed by a regulator of the shared radio frequency band or a certain deployment, which can be in the range from about 2 ms to about 10 ms (e.g., which may correspond to from about 4 slots to about 20 slots in NR CV2X with 30 kHz subcarrier spacing (SCS)). Thus, in some instances, the sidelink transmission with the small-sized data bursts may not occupy the entire duration of the COT. Accordingly, it may be desirable to share the remaining duration of the COT with the receiving or other UEs instead of leaving the remaining COT unused. In some instances, the initiating UE may include COT-related information such as but not limited to the duration of the COT in its transmissions so that the receiving UEs can use the information to share/utilize the COT. For example, the initiating UE may transmit a PSCCH after initiating the COT and the SCI in the PSCCH may include the COT-related information. As another example, the initiating UE may transmit a PSCCH or a PSSCH after initiating the COT, and the SCI-1 in the PSCCH or the SCI-2 in the PSSCH, respectively, may include the COT-related information. In some cases, after receiving the SCI, SCI-1 or SCI-2, the receiving or other UEs may perform a CAT2 LBT or no LBT when the receiving or other UEs transmit during the COT initiated by the COT-initiating UE, which can be advantageous because CAT2 LBT or no LBT has less uncertainty in accessing the channel.

In some aspects, regulations may also specify that a COT in a shared/unlicensed frequency band has to be used in an at least substantially continuous manner so that the COT is not considered released prior to its expiration. That is, the regulations impose that, after a COT is initiated by a COT-initiating UE and used for transmission, the remaining duration of the COT has to be used for transmissions without a significant gap (e.g., without a gap larger than 25 μs, 16 μs, 9 μs, etc.) between successive transmissions; otherwise, the COT may be considered released prior to its expiration and other UEs may have to contend for a new COT in the unlicensed radio frequency band, for their upcoming transmissions. In NR-U, each UE is served by one serving BS, and the serving BS may manage the scheduling of at least substantially back-to-back UE/BS transmissions in a COT initiated by the UE or by the serving BS so that the COT may not be considered released prior to the expiration of the COT. Further, in some instances such as NR sidelink operations such as C-V2X operations that support PSFCH transmissions, transmission gaps can occur even in COTs where there are back-to-back PSSCH transmissions because of the slot structure used to support the PSFCH transmissions. For example, in C-V2X, C-V2X slots may be used for PSFCH transmissions, and even if PSSCH transmissions are transmitted over these slots within a COT, transmission gaps may occur in the COT if there are no PSFCH transmissions in the slots, which can lead to the COT being released because of the (PSFCH) gaps in the COT.

As such, in some aspects, for a first UE to share a portion of a COT initiated by a second UE (i.e., a COT-initiating UE) in a mode 2 sidelink operation that supports PSFCH transmissions, the UE may detect a PSFCH transmission during the COT and infer that the PSFCH transmission is transmitted via the C-V2X slots within the COT, which allows the UE to conclude that the COT has not been released due to an unused gap in the COT and as such is available for sharing with the UE. For example, a COT-initiating UE may initiate a COT as discussed above and transmit a PSSCH transmission that is configured to trigger a PSFCH transmission from one or more second UEs receiving the PSSCH transmission. For instance, the PSSCH transmission may include an explicit or implicit request for a PSFCH transmission from the receiving UEs. In such cases, if a third UE seeking to share a portion of the COT fails to detect a PSFCH transmission during the COT, the third UE may infer that a part of the slot for the PSFCH transmission has gone unused and as such the COT may be considered released due to the regulation imposing at least almost continual or back-to-back transmissions within the COT. On the other hand, in some cases, the third UE may detect a PSFCH transmission during the COT and may infer that the COT has not been released and as a result is available for the third UE to share and utilize as discussed above. This inference, however, may be inaccurate because, although the third UE detected a PSFCH transmission during the COT, the detected PSFCH transmission may not have been part of the COT, and the conclusion by the third UE that the COT is still available for sharing may be mistaken. As such, there is a need for methods and systems that allow a UE seeking to share or utilize a COT initiated by a COT-initiating UE in a mode 2 sidelink operation that supports PSFCH transmissions to infer whether a detected PSFCH activity corresponds to the COT of interest (e. g., that COT initiated by the COT-initiating UE), i.e., to infer whether the detected PSFCH transmission transmitted during the COT is in fact part of the COT or transmitted using the COT.

Further, in some aspects, a first UE seeking to share/utilize a COT initiated by a second UE (i.e., a COT-initiating UE) may have to be within a maximum spatial range of the COT-initiating UE to be allowed to share/use the COT. This is because, for example, the interference at the location of the first UE, and experienced by the first UE, may be different from the interference at the location of the COT-initiating UE and experienced by the COT-initiating UE when the COT-initiating UE initiated the COT. In other words, the successful LBT performed by the COT-initiating UE to obtain the COT may not be an indication to the first UE, which may be far away from the COT-initiating UE and in some cases experiencing different signal interference than the COT-initiating UE, that the first UE can share and utilize the COT. In some instances, the maximum distance or spatial range from the COT-initiating UE within which the first UE has to be located to be allowed to share and use the COT may be pre-configured, i.e., provided by the network to the UE (e.g., COT-initiating UE, first UE, etc.) via signaling. In some instances, the UEs may have default configurations of the maximum distance or spatial range (e.g., for use when a UE is out of network). As used herein, the term "in-range UE" used with reference to a COT-initiating UE can refer to a UE that is within the maximum spatial range of the COT-initiating UE. Further, as used herein, the term "out-of-range UE" used with reference to a COT-initiating UE can refer to a UE that is outside the maximum spatial range of the COT-initiating UE.

In some instances, the COT-initiating UE may transmit, after initiating the COT, a transmission within the COT and the transmission may include location data of the COT-initiating UE. For example, the COT-initiating UE may transmit a PSCCH after initiating the COT and the SCI in the PSCCH may include the location data of the COT-initiating UE. As another example, the COT-initiating UE may transmit a PSCCH or a PSSCH after initiating the COT, and the SCI-1 in the PSCCH or the SCI-2 in the PSSCH, respectively, may include the location data of the COT-initiating UE. In such cases, a UE seeking to share the COT (e.g., such as the afore-mentioned first UE) may receive the SCI, SCI-1 or SCI-2 and determine whether it is an "in-range UE," (e.g., whether the UE is within the maximum distance or spatial range from the COT-initiating UE to be allowed to share and utilize the COT (e.g., and start sharing and utilizing the COT if the UE is in fact within the maximum range)). In some aspects, a second UE that detects a PSFCH transmission within or during the COT may receive the SCI, SCI-1 or SCI-2 and use the location-data of the COT-initiating UE to infer or determine whether the PSFCH is part of the COT, i.e., transmitted using the COT, and/or whether the UE transmitting the PSFCH transmission is an "in-range UE" with reference to the COT-initiating UE.

Some aspects of the present disclosure disclose methods, systems and apparatus directed to channel occupancy time (COT) sharing for sidelink communications in unlicensed bands, in particular mode 2 sidelink operations that support PSFCH transmissions. In some aspects, a UE that tracks COT activity seeking to share and utilize a portion of the COT may measure the reference signal received power (RSRP) of a PSFCH transmission transmitted during or within the COT, and may assume or infer that the PSFCH transmission is part of the COT (e.g., the PSFCH transmission is transmitted using the COT) if the measured RSRP value of the PSFCH transmission is greater than a threshold RSRP. In some cases, the UE may make this assumption because PSFCH transmissions from in-range UEs may statistically be expected to have RSRP values greater than RSRP values of PSFCH transmissions from out-of-range UEs. As such, when the measured RSRP value exceeds the threshold RSRP value, the UE seeking to share and utilize the COT may assume that the PSFCH transmission was transmitted using the COT (e.g., by an in-range UE that is within the maximum spatial range of the COT-initiating UE), and as such, the COT has not been released because of an unused gap in the COT. In such cases, the UE tracking the COT activity may then proceed with sharing and utilizing a portion of the COT.

In some aspects, a COT-initiating UE or another UE allowed to utilize the COT, may transmit, using the COT, a transmission with a request for feedback to the transmission. For instance, the COT-initiating UE or the other UE may transmit a PSSCH transmission using the COT that includes a request for a PSFCH. In such cases, if another UE (e.g., another UE seeking to share and utilize a portion of the COT) detects a PSFCH transmitted within or during the COT in response to the PSSCH transmission, this UE may assume or infer that the PSFCH is part of the COT, i.e., the PSFCH is transmitted using the COT (e.g., by an in-range UE that is within the maximum spatial range of the COT-initiating UE or the other UE allowed to utilize the COT). In some cases, the UE seeking to share and utilize a portion of the COT may make this assumption because a PSFCH transmission transmitted in response to a PSSCH transmission is more likely to have originated from a UE that is an in-range UE with respect to the COT-initiating UE (e.g., and/or the other UE allowed to utilize the COT), and as such the PSFCH is transmitted using the COT that is initiated by the COT-initiating UE and used for transmitting the PSSCH. In such instances, the UE seeking to share and utilize a portion of the COT may infer that the COT has not been released because of an unused gap in the COT, and may proceed with sharing and utilizing the portion of the COT.

In some aspects, the PSSCH transmission from the COT-initiating UE can be a groupcast option-1 PSSCH transmission. In some cases, the groupcast option-1 PSSCH transmission may not be part of the COT initiated by the COT-initiating UE. For example, the groupcast option-1 PSSCH transmission may have been transmitted using a different COT that has already ended. In such cases, if a UE that tracks COT activity seeking to share and utilize a portion of the COT initiated by the COT-initiating UE detects a NACK transmission corresponding to the groupcast option-1 PSSCH transmission, this UE may assume or infer that the NACK is part of the COT, i.e., the NACK is transmitted using the COT (e.g., by an in-range UE that is within the maximum spatial range of the COT-initiating UE). In some cases, the UE may make this assumption because NACK-only feedbacks can be restricted to UEs that are within a certain range of COT-initiating UEs. As such, the UE may infer or assume that the NACK was transmitted using the COT by an in-range UE (e.g., in-range with respect to the COT-initiating UE) and that, as a result, the COT has not been released because of an unused gap in the COT. In such instances, the UE tracking the COT activity may then proceed with sharing and utilizing the portion of the COT.

In some instances, the UE seeking to share and utilize the portion of the COT may make the inference that the NACK-only transmission is transmitted by a nearby in-range UE if the feedback range of the UE requesting the NACK-only PSFCH (i.e., the UE transmitting the groupcast option 1 PSSCH transmission) is less than a threshold feedback range. Such a limitation may keep the UE seeking to share and utilize the portion of the COT from erroneously assuming, for example when the feedback range of the UE requesting the NACK-only PSFCH is much larger than the maximum spatial range of the COT, that UEs that are outside of the maximum spatial range of the COT are in fact in-range with respect to the COT and are allowed to share and use the COT. In some cases, the threshold feedback range can be about equal to (e.g., within ten percent of) the maximum spatial range of the COT.

Aspects of the present disclosure can provide several benefits. For example, some aspects allow a UE tracking COT activity seeking to share and utilize a portion of the COT to infer or determine whether a PSFCH transmission corresponds to or is a part of the COT (e.g., whether the PSFCH transmission is transmitted using the COT), which in turn allows the UE to refrain from blindly or unnecessarily assuming that the COT has been released, improving the efficiency of sidelink communications. Further, sidelink COT sharing in unlicensed bands is improved because UEs can access portions of COTs which may otherwise be released because of regulations imposing at least near continual transmissions within the COTs for the COTs to remain active and not be considered released.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs **115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115**.

In operation, the BSs **105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d***. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE **115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such asV2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105**.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRS s) and/or channel state information—reference signals (CSI-RS s) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 decodes the DL data packet successfully, the UE 115 may transmit a HARQ acknowledgement (ACK) to the BS 105. Conversely, if the UE 115 fails to decode the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding.

The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

In some aspects, the network 100 may provision for sidelink communications to allow a UE 115 to communicate with another UE 115 without tunneling through a BS 105 and/or the core network. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages. In a first-stage SCI (which may be referred to as SCI-1), the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI (which may be referred to as SCI-2), the UE 115 may transmit SCI in PSSCH carrying information for decoding the PSSCH. The second-stage SCI may include an 8-bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

In some aspects, a sidelink communication can be in a unicast mode, a groupcast mode, or a broadcast mode, where HARQ may be applied to unicast and/or groupcast communications. For unicast communication, a sidelink transmitting UE 115 may transmit a sidelink transmission including data to a single sidelink receiving UE 115 and may request a HARQ acknowledgement/negative-acknowledgement (ACK/NACK) feedback from the sidelink receiving UE 115. If the sidelink receiving UE 115 successfully decoded data from the sidelink transmission, the sidelink receiving UE 115 transmits an ACK. Conversely, if the sidelink receiving UE 115 fails to decode data from the sidelink transmission, the sidelink receiving UE 115 transmits an NACK. Upon receiving a NACK, the sidelink transmitting UE 115 may retransmit the data. For broadcast communication, a sidelink transmitting UE 115 may transmit a sidelink transmission to a group of sidelink receiving UEs 115 (e.g., 2, 3, 4, 5, 6 or more) in a neighborhood of the sidelink transmitting UE 115 and may not request for an ACK/NACK feedback for the sidelink transmission.

For groupcast communication, a sidelink transmitting UE 115 may transmit a sidelink transmission to a group of sidelink receiving UEs 115 (e.g., 2, 3, 4, 5, 6 or more). Groupcast communication may have a wide variety of use cases in sidelink. As an example, groupcast communication can be used in a V2X use case (e.g., vehicle platooning) to instruct a group of vehicles nearby an intersection or traffic light to stop at the intersection. In some aspects, a groupcast communication can be connection-based, where the group of the sidelink receiving UEs 115 may be preconfigured as a group identified by a group identifier (ID). As such, the sidelink receiving UEs 115 in the group are known to the sidelink transmitting UE 115, and thus the sidelink transmitting UE 115 may request an ACK/NACK feedback from each sidelink receiving UE 115 in the group. In some instances, the sidelink transmitting UE 115 may provide each sidelink receiving UE with a different resource (e.g., an orthogonal resource) for transmitting an ACK/NACK feedback. In some other aspects, a groupcast communication can be connectionless, where the group of sidelink receiving UEs 115 that can receive the groupcast transmission may be unknown to the sidelink transmitting UE 115. In some instances, the group of sidelink receiving UEs 115 may receive the groupcast communication based on a zone or geographical location of the receiving UEs 115. Since the sidelink transmitting UE 115 may not have knowledge of the receiving sidelink UEs 115, the sidelink transmitting UE 115 may request an NACK-only feedback from the sidelink receiving UEs 115, referred to as a groupcast option-1 transmission. For instance, a sidelink receiving UE 115 may transmit an NACK if the sidelink receiving UE detected the presence of SCI, but fails to decode data (transport block) from the sidelink transmission. The sidelink receiving UE 115 may not transmit an ACK if the data decoding is successful. Groupcast option-2 transmission refers to the scenario where a sidelink receiving UE transmits an ACK if the data decoding is successful and transmits an NACK if the decoding fails. In some instances, the sidelink receiving UEs 115 may be assigned with the same resource for transmitting an NACK feedback. The simultaneous NACK transmission from multiple sidelink receiving UEs 115 in the same resource may form a single frequency network (SFN) transmission (where waveforms of the multiple NACK transmissions are combined) at the sidelink transmitting UE 115. Similar to the unicast communication, the sidelink transmitting UE 115 may retransmit sidelink data upon receiving an NACK for a connection-based or connection-less groupcast transmission.

Figure 2:
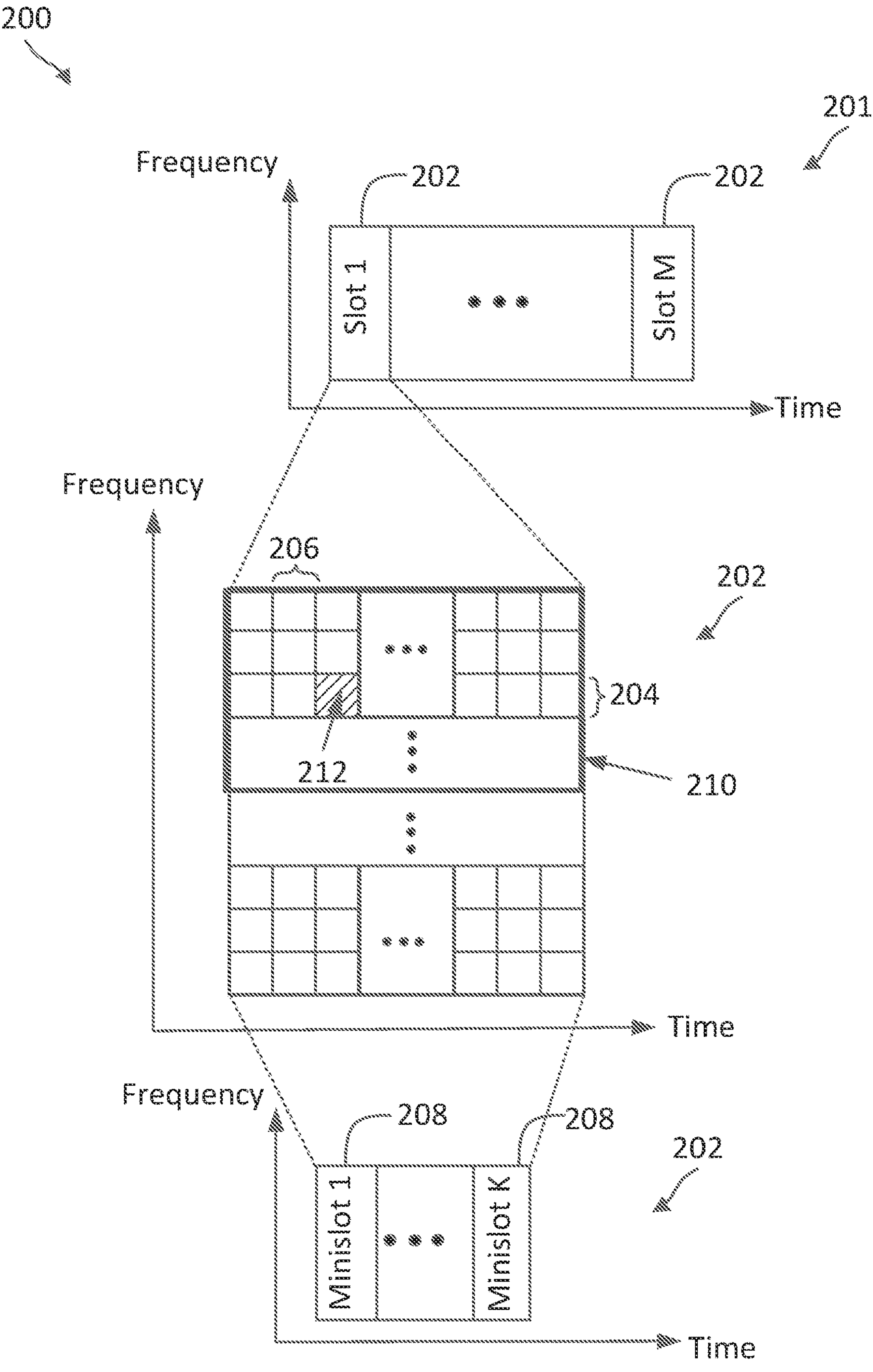
FIG. 2 is a timing diagram illustrating a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols). In some aspects, a UE (e.g., UE 115*i* of FIG. 1) may communicate sidelink with another UE (e.g., UE 115*j* of FIG. 1) in units of time slots similar to the slot 202 as will be further described below in with respect to FIG. 4.

Figure 3:
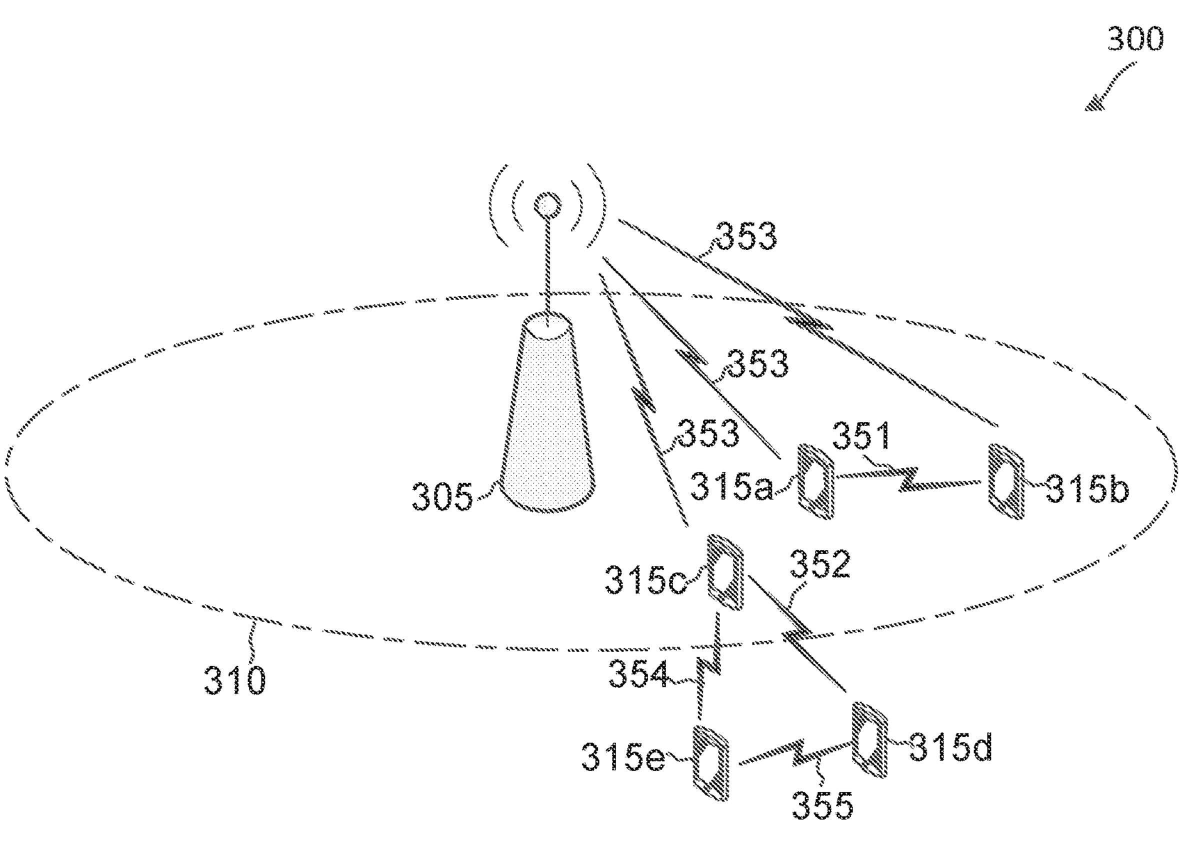
FIG. 3 illustrates a wireless communication network that provisions for sidelink communications according to some aspects of the present disclosure.

FIG. 3 illustrates an example of a wireless communication network 300 that provisions for sidelink communications according to aspects of the present disclosure. The network 300 may correspond to a portion of the network 100 may utilize the radio frame structure 200 for communications. FIG. 3 illustrates one BS 305 and five UEs 315 (shown as 315*a*, 315*b*, 315*c*, 315*d*, and 315*e*) for purposes of simplicity of discussion, though it will be recognized that aspects of the present disclosure may scale to any suitable number of UEs 315 (e.g., the about 2, 3, 4, 6, 7 or more) and/or BSs 305 (e.g., the about 2, 3 or more). The BS 305 and the UEs 315 may be similar to the BSs 105 and the UEs 115, respectively. The BS 305 and the UEs 315 may share the same radio frequency band for communications. In some instances, the radio frequency band may be a licensed band. In some instances, the radio frequency band may be an unlicensed band. In some instances, the radio frequency band may be a frequency range 1 (FR1) band. In some instances, the radio frequency band may be a FR2 band. In general, the radio frequency band may be at any suitable frequency.

In the network 300, some of the UEs 315 may communicate with each other in peer-to-peer communications. For example, the UE 315*a* may communicate with the UE 315*b* over a sidelink 351, the UE 315*c* may communicate with the UE 315*d* over a sidelink 352 and/or with the UE 315*e* over a sidelink 354, and the UE 315*d* may communicate with the UE 315*e* over a sidelink 355. The sidelinks 351, 352, 354, and 355 are unicast bidirectional links. In some aspects, the UE 315*c* may also communicate with the UE 315*d* and the UE 315*e* in a groupcast mode. Similarly, the UE 315*d* may also communicate with the UE 315*c* and the UE 315*e* in a groupcast mode. In general, the UEs 315*c*, 315*d*, an 315*e* may communicate with each other in a unicast mode or a groupcast mode.

Some of the UEs 315 may also communicate with the BS 305 in a UL direction and/or a DL direction via communication links 353. For instance, the UE 315*a*, 315*b*, and 315*c* are within a coverage area 310 of the BS 305, and thus may be in communication with the BS 305. The UE 315*d* and UE 315*e* are outside the coverage area 310, and thus may not be in direct communication with the BS 305. In some instances, the UE 315*c* may operate as a relay for the UE 315*d* to reach the BS 305. In some aspects, some of the UEs 315 are associated with vehicles (e.g., similar to the UEs 115*i-k*) and the communications over the sidelinks 351 and/or 352 may be C-V2X communications. C-V2X communications may refer to communications between vehicles and any other wireless communication devices in a cellular network.

Figure 4A:
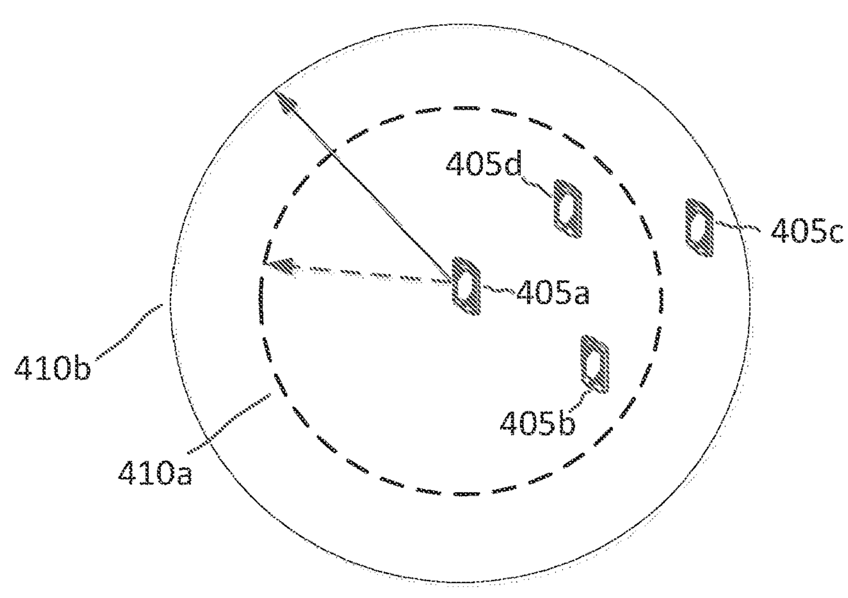
FIG. 4A shows a schematic illustrating a spatial range of a COT initiated by a COT-initiating UE according to some aspects of the present disclosure.
Figure 4B:
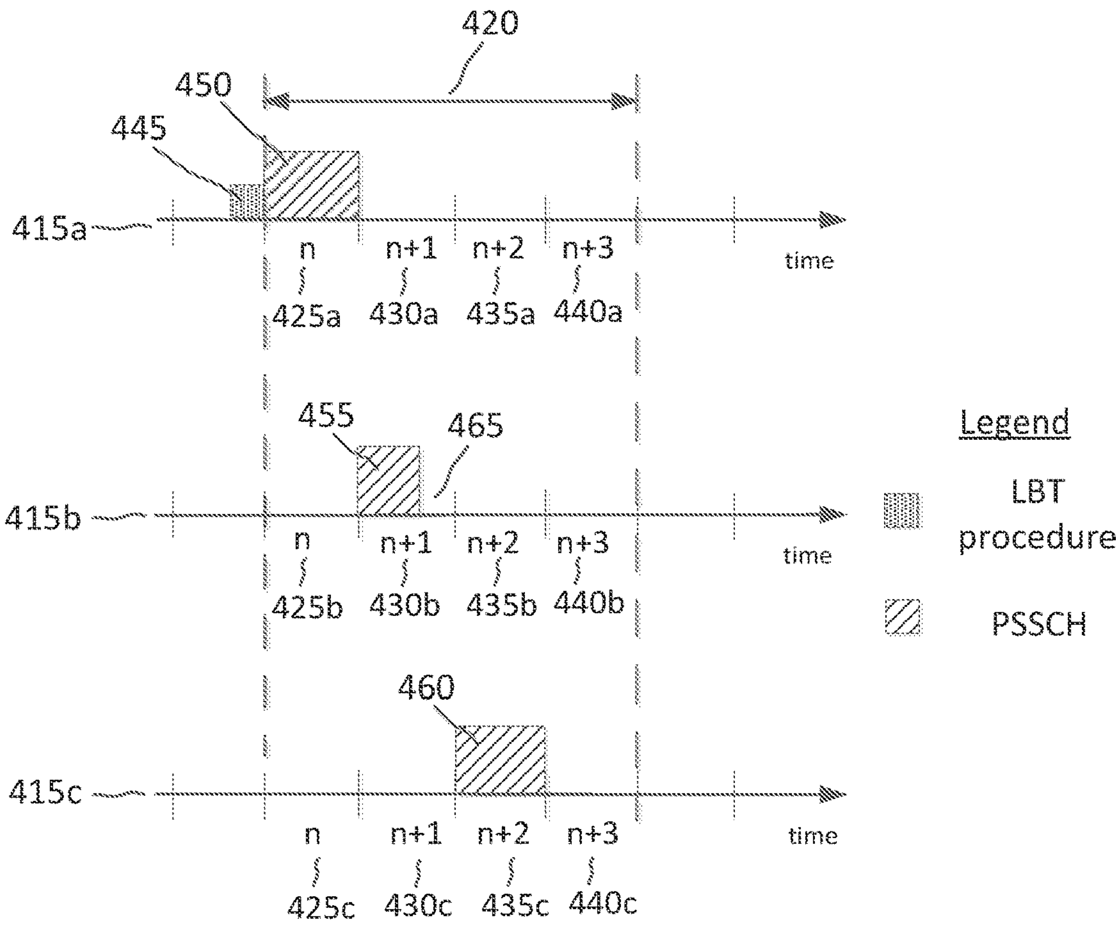
FIG. 4B shows timing diagrams illustrating a sidelink communication scheme in unlicensed bands according to some aspects of the present disclosure.

FIG. 4A and FIG. 4B show a schematic illustrating a spatial range of a COT initiated by a COT-initiating UE and timing diagrams illustrating a sidelink communication scheme in unlicensed bands, respectively, according to some aspects of the present disclosure. In FIG. 5B, the x-axis represents time in CV2X slots. In some aspects, a sidelink UE 405*a* may acquire a COT 420 by performing a clear channel assessment (CCA) or a category 4 (CAT4) listen-before-talk (LBT) in an unlicensed or shared radio frequency band. For example, as shown in the example timing diagram 415*a*, the sidelink UE 405*a* may perform a LBT procedure 445 prior to slot n to acquire a COT 420 starting at slot n. In the example timing diagram 415*a*, the sidelink UE 405*a* is shown to have acquired 4 slots (slots n 425*a*, n+1 430*a*, n+2 435*a* and n+3 440*a*), but it is to be understood that COT 420 is an illustrative example and COT 420 can have any number of slots. The COT 420 are also shown to include slots n 425*b*, n+1 430*b*, n+2 435*b* and n+3 440*b* and slots n 425*c*, n+1 430*c*, n+2 435*c* and n+3 440*c* in the example timing diagrams 415*b* and 415*c*, respectively, corresponding to other sidelink UEs communicating with the COT-initiating sidelink UE 405*a* (e.g., sidelink UEs such as 405*b*, 405*c* and 405*d*).

In some aspects, after performing an LBT procedure 445 and acquiring the COT 420, the sidelink UE 405*a* may transmit a transmission 450 using slot n 425*a* of example timing diagram 415*a*. In some instances, the transmission 450 can a PSCCH/PSSCH transmission and may include COT sharing information. For example, the transmission can be a PSCCH transmission that includes a SCI having COT-sharing information such as but not limited to the duration of the COT 420, the location of the COT-initiating sidelink UE 405*a*, etc. In some cases, the SCI may also include the maximum spatial range of the COT 420 (e.g., first spatial range 410*a* or second spatial range 410*b*). The maximum spatial range of the COT 420 may refer to the distance or spatial range from the COT-initiating sidelink UE 405*a* outside of which other sidelink UEs are not allowed to share or utilize the COT 420. For example, with reference to FIG. 4A, if the maximum spatial range of the COT 420 initiated by the COT-initiating sidelink UE 405*a* is the first spatial range 410*a*, then sidelink UE 405*b* is allowed to share and use the COT 420 (e.g., starting at slot n+1 430*b* of example timing diagram 415*b*), while sidelink UE 405*c* is not allowed to share and use the COT 420 because sidelink UE 405*c* is outside the first spatial range 410*a*. If, on the other hand, the maximum spatial range of the COT 420 initiated by the COT-initiating sidelink UE 405*a* is the second spatial range 410*b*, then both sidelink UE 405*a* and sidelink UE 405*b* are allowed to share and use the COT 420 because both sidelink UE 405*a* and sidelink UE 405*b* are within the second spatial range 410*b*. As another example, the COT-initiating transmission 450 can include a PSCCH having an SCI-1 and a PSSCH having a SCI-2, and one or both of the SCI-1 and the SCI-2 may include the afore-mentioned COT-sharing information (e.g., the duration of the COT 420, the location of the COT-initiating sidelink UE 405*a*, the spatial range of the COT 420, etc.). In some aspects of sidelink operations, PSCCH transmission and PSSCH transmission may not occur standalone. That is, every slot that includes a PSCCH transmission may also include a PSSCH transmission, and vice versa. As such, in some aspects, discussions related to transmissions of a PSCCH or a PSSCH transmission may be understood to include transmissions of both a PSCCH and a PSSCH (e.g., and may be referred as a PSCCH transmission, a PSSCH transmission, or a PSCCH/PSSCH transmission).

In some aspects, regulations imposed by a regulator of the unlicensed or shared radio frequency band require that for the COT 420 not to be considered released after the transmission 450 by the COT-initiating sidelink UE 405*a*, the COT 420 may have to be used for transmitting transmissions in an almost continual manner. That is, for example, after the COT-initiating transmission 450 is transmitted via slot n 425*a* of example timing diagram 415*a*, a second transmission have to occur via slot n+1 430, almost immediately (e.g., within 25 μs, 16 μs, 9 μs, etc.); otherwise, the regulations require that the COT 420 may be considered released (e.g., and as such, a sidelink UE seeking to share and use the COT 420 may have to find another COT or initiate its own COT by performing a LBT procedure). In some cases, such a requirement applies to the entirety of the COT 420, effectively requiring at least substantially back-to-back transmissions (e.g., with gaps between transmissions, if any, being no greater than 25 μs, 16 μs, 9 μs, etc.) in the COT 420 for the COT 420 to remain active and not be considered released.

Further, as discussed above, any transmissions in the remaining slots of COT 420, slot n+1 430, slot n+2 435, and slot n+3 440, may have to come from the sidelink UEs that are within the maximum spatial range of the COT 420. That is, for the transmissions occurring in the slots of the COT 420 to be considered at least substantially back-to-back transmissions, those transmissions have to originate from sidelink UEs that are within the spatial range of the COT 420. For instance, if the maximum spatial range of the COT 420 is the first spatial range 410*a* and sidelink UE 405*c* transmitted over slot n+1 430 (e.g., using a COT different from COT 420), the COT 420 may be considered released (e.g., shortly after the start of the slot n+1 430) because sidelink UE 405*c* is outside the first spatial range 410*a*. In such cases, sidelink UE 405*b* may not be able to share and utilize the COT 420 for its own transmissions (e.g., either has to use another COT or initiate its own by performing a LBT). This can be the case, i.e., the COT 420 may be considered released and sidelink UE 405*b* may be unable to use COT 420, even though sidelink UE 405*b* detects continuous or at least substantially back-to-back transmission activities since the start of the COT 420, because the detection includes the transmission by the out-of-range sidelink UE 405*c*).

In some aspects, at least a part of the slot of the COT 420, such as slot n+1 430*b* shown in example timing diagram 415*b*, may be reserved for feedback transmissions configured to be transmitted in response to a prior transmission, examples of such prior and feedback transmissions including a PSCCH or PSSCH transmission, and a PSCFH transmission, respectively. In some instances, if no PSFCH transmission is transmitted over the slot n+1 430*b* reserved for PSFCH transmissions, then the COT 420 may be released due to an unused gap 465 in the COT (e.g., because of absence of a PSFCH transmission in a slot reserved for PSFCH transmissions), even when a portion of the same slot n+1 430*b* is used by a sidelink UE for a transmission 455. In other words, a sidelink UE seeking to share and utilize the COT 420 (e.g., seeking to transmit over slot n+2 435*c* of example timing diagram 415*c*) may have to, before sharing and using slot n+2 435 of the COT 420, determine if in fact a PSFCH was transmitted over slot n+1 430*b* so as to infer that the COT 420 was not released and remains active.

In some aspects, a sidelink UE seeking to share and utilize the COT 420 may measure the reference signal received power (RSRP) of a PSFCH transmission transmitted during the COT 420, and infer that the PSFCH transmission was part of the COT 420, i.e., the PSFCH transmission was transmitted using the COT 420, if the measured RSRP exceeds a threshold RSRP value. In other words, if the measured RSRP exceeds the threshold RSRP value, the sidelink UE can assume that the PSFCH transmission is transmitted using the COT by another sidelink UE that is within the maximum spatial range of the COT 420 (e.g., and as such the COT remains active and the sidelink UE is allowed to share and use the COT 420). In some cases, the sidelink UE can infer as such, i.e., the sidelink UE can infer that the PSFCH transmission is transmitted using the COT by another sidelink UE that is in-range UE with respect to the COT 420, because PSFCH transmissions from in-range UEs may be statistically expected to have RSRP values greater than RSRP values of PSFCH transmissions from out-of-range UEs.

In some aspects, the threshold RSRP value may be such that the RSRP of PSFCH transmissions from sidelink UEs within or outside the maximum spatial range of the COT 420 are greater than or less than, respectively, the threshold RSRP value. In some instances, the inference that the PSFCH transmission is transmitted by an in-range sidelink UE using the COT 420 may allow the sidelink UE seeking to share and utilize the COT 420 to conclude that the COT 420 has not been released and remains active. In such cases, the sidelink UE may then proceed with accessing the COT 420 to use for its own transmissions. In some instances, the measured RSRP may be less than the threshold RSRP value and the sidelink UE may then infer that the PSFCH transmitted during the COT (e.g., and the RSRP of which is measured by the sidelink UE seeking to use the COT 420) may not be part of the COT, i.e., the COT may not have been used for transmitting the PSFCH. In such cases, the sidelink UE may conclude that the COT may have been released due to unused gap in the COT and may not proceed with accessing the COT for its own transmissions.

As an example illustration, if the maximum spatial range of the COT 420 is the first spatial range 410*a*, then in some cases, the threshold RSRP value may be such that a RSRP value of PSFCH transmissions from a sidelink UE within the first spatial range 410*a* (e.g., such as in-range sidelink UEs 405*b*, 405*d*) is greater than the threshold RSRP value, while the RSRP value of a PSFCH transmission from a sidelink UE outside the first spatial range 410*a* (e.g., such as out-of-range sidelink UE 405*c*) is less than the threshold RSRP value. In such an example, if sidelink UE 405*b*, seeking to share and use the COT 420 measures the RSRP of a PSFCH transmission occurring within the COT 420, then sidelink UE 405*b* may discover that the measured RSRP is less than the threshold RSRP value, and as such the PSFCH transmission was not transmitted using the COT 420, i.e., the PSFCH transmission was transmitted by an out-of-range UE (e.g., out-of-range with respect to the COT 420) that is not allowed to use the COT 420. In such cases, the sidelink UE 405*b* seeking to share and use the COT 420 may assume that the COT 420 has been released and not access the COT 420. On the other hand, if the measured RSRP is greater than the threshold RSRP value, then the sidelink UE 405*b* may infer that the PSFCH transmission was transmitted using the COT 420, i.e., the PSFCH transmission was transmitted by an in-range UE such as sidelink UE 405*d* that is allowed to use the COT 420, and the sidelink UE 405*b* may then access the COT 420. For instance, the sidelink UE 405*b* may access the COT 420 at slot n+2 435*c* for transmitting a transmission 460.

In some aspects, the threshold RSRP value may be pre-defined (e.g., in a 3GPP specification). In some aspects, the threshold RSRP value may be computed by a NR network to which the sidelink UE performing the RSRP measurement is connected, and provided to that sidelink UE via the serving BS of the sidelink UE. In some aspects, the threshold RSRP value may be computed by the sidelink UE performing the RSRP measurement of the PSFCH transmission. For example, the sidelink UE may measure or otherwise obtain the RSRP of the initial transmission of the COT-initiating UE transmitted using the COT (e.g., COT-initiating transmission 450 for the COT 420) and use that RSRP as a reference or baseline for setting the threshold RSRP value (e.g., the threshold RSRP value may be set about 5 dB lower than the RSRP of the COT-initiating transmission). As another example, the sidelink UE may set the threshold RSRP value such that RSRP values of PSFCH transmissions from out-of-range and in-range UEs are lower than and greater than, respectively, the threshold RSRP value.

In some aspects, as noted above, a slot of the COT 420, such as slot n+1 430*b* shown in example timing diagram 415*b*, may be reserved for feedback transmissions configured to be transmitted in response to a prior transmission, examples of such prior and feedback transmissions including a PSCCH/PSSCH transmission, and a PSCFH transmission, respectively. In some instances, the PSCCH/PSSCH transmission may include an explicit or implicit request for the PSFCH transmission (e.g., via a SCI of the PSCCH). For example, the COT-initiating transmission 450 transmitted by the COT-initiating UE 405*a* after acquiring the COT 420 can be a PSCCH/PSSCH transmission that includes an explicit or implicit request for feedback (e.g., PSFCH transmission), from the sidelink UEs that receive the PSCCH or a PSSCH transmission, in response to the PSCCH or a PSSCH transmission. As another example, other transmissions using the COT 420 from sidelink UEs that have been allowed to access the COT may be PSSCH transmissions requesting PSFCH transmissions from the receivers of the PSSCH transmissions. In some instances, the PSCCH or PSSCH transmission may include COT-sharing information such as but not limited to the duration of the COT 420, the location of the COT-initiating sidelink UE 405*a*, the spatial range of the COT 420, etc.

In such cases, if sidelink UE 405*b* that has received the PSCCH or PSSCH and is seeking to share and use the COT 420, detects a PSFCH transmitted during the COT 420, the sidelink UE 405*b* may infer that the PSFCH is transmitted by a nearby in-range sidelink UE (i.e., in-range with respect to the COT 420) that is allowed to share and use the COT 420, and as such the PSFCH was part of the COT 420 (e.g., was transmitted using the reserved slot n+1 430*b* of the COT 420). In some cases, such an inference may allow the sidelink UE 405*b* to conclude that the COT 420 has not been released due to an unused gap and that the COT 420 remains active, in which case the sidelink UE 405*b* may then proceed with accessing the COT to share and use for its own transmissions. In some cases, the sidelink UE 405*b* may infer that the PSFCH is transmitted in response to the PSCCH or PSSCH because the sidelink UE 405*b* has also received the PSCCH or PSSCH and is aware of the type of corresponding PSFCH transmission that may be transmitted in response to the received PSCCH or PSSCH transmission. Further, in some instances, the sidelink UE 405*b* may determine that the sidelink UE 405*b* is in-range with respect to the COT 420 by using the COT-sharing information transmitted by the COT-initiating transmission 450 and received by the sidelink UE 405*b*. For example, the sidelink UE 405*b* may determine, using the location of the COT-initiating sidelink UE 405*a* and the spatial range of the COT 420, that the sidelink UE 405*b* is within the maximum spatial range of the COT 420.

In some instances, the prior transmission that may trigger the PSFCH transmission may not have been transmitted using the COT 420 (e.g., the prior transmission may be different from the COT-initiating transmission 450) while in some cases, the prior transmission may have been transmitted using the COT 420. An example of such a prior transmission is a groupcast option 1 PSSCH transmission transmitted via a slot that is not part of the COT 420. For instance, the groupcast option 1 PSSCH transmission may have been transmitted by a sidelink UE using a COT that is different from the COT 420 and that has since ended. In some aspects, such a groupcast option 1 PSSCH transmission may include a request for a NACK-only feedback (e.g., NACK-only PSFCH) in the form of a PSFCH from sidelink UEs that receive the groupcast option 1 PSSCH transmission. In some instances, the prior transmission or another transmission by the sidelink UE that initiated the COT 420 may include COT-sharing information such as but not limited to the duration of the COT 420, the location of the COT-initiating sidelink UE 405*a*, the spatial range of the COT 420, etc.

In such cases, if sidelink UE 405*b* that has received the groupcast option 1 PSSCH transmission and is seeking to share and use the COT 420, detects a NACK-only PSFCH transmitted during the COT 420, the sidelink UE 405*b* may infer that the NACK-only PSFCH is transmitted using the COT 420 by a nearby sidelink UE that is in-range with respect to the COT 420. In some instances, the sidelink UE 405*b* may make this inference because NACK-only feedbacks may be restricted to UEs that are within a feedback range of the sidelink UE requesting the NACK-only feedback (i.e., within the feedback range of the sidelink UE transmitting the groupcast option 1 PSSCH transmission). In some instances, the sidelink UE 405*b* may further infer that the PSFCH was part of the COT 420 (e.g., was transmitted using the reserved slot n+1 430*b* of the COT 420), and conclude that the COT 420 has not been released due to an unused gap and that the COT 420 remains active. In such cases, the sidelink UE 405*b* may then proceed with accessing the COT to share and use for its own transmissions. In some cases, the sidelink UE 405*b* may infer that the NACK-only PSFCH is transmitted in response to the groupcast option 1 PSSCH transmission because the sidelink UE 405*b* has also received the groupcast option 1 PSSCH transmission and is aware of the type of corresponding PSFCH transmission (e.g., NACK-only feedback) that may be transmitted in response to the received groupcast option 1 PSSCH transmission. In some instances, the sidelink UE 405*b* may determine that it (i.e., the sidelink UE 405*b*) is in-range with respect to the COT by using the COT-sharing information transmitted by the COT-initiating UE and received by the sidelink UE 405*b*. For example, the sidelink UE 405*b* may determine, using the location of the COT-initiating sidelink UE 405*a* and the spatial range of the COT 420, that the sidelink UE 405*b* is within the maximum spatial range of the COT 420.

In some instances, the sidelink UE 405*b* may make the inference that the NACK-only PSFCH is transmitted by a nearby in-range sidelink UE if the feedback range of the sidelink UE requesting the NACK-only PSFCH (i.e., the sidelink UE transmitting the groupcast option 1 PSSCH transmission) is less than a threshold feedback range. Such a limitation may keep the sidelink UE 405*b* from erroneously assuming, for example when the feedback range of the sidelink UE requesting the NACK-only PSFCH is much larger than the maximum spatial range of the COT 420, that sidelink UEs that are outside of the maximum spatial range of the COT 420 are in fact in-range with respect to the COT and are allowed to share and use the COT 420. In some cases, the threshold feedback range can be about equal to (e.g., within ten percent of) the maximum spatial range of the COT 420.

Figure 5:
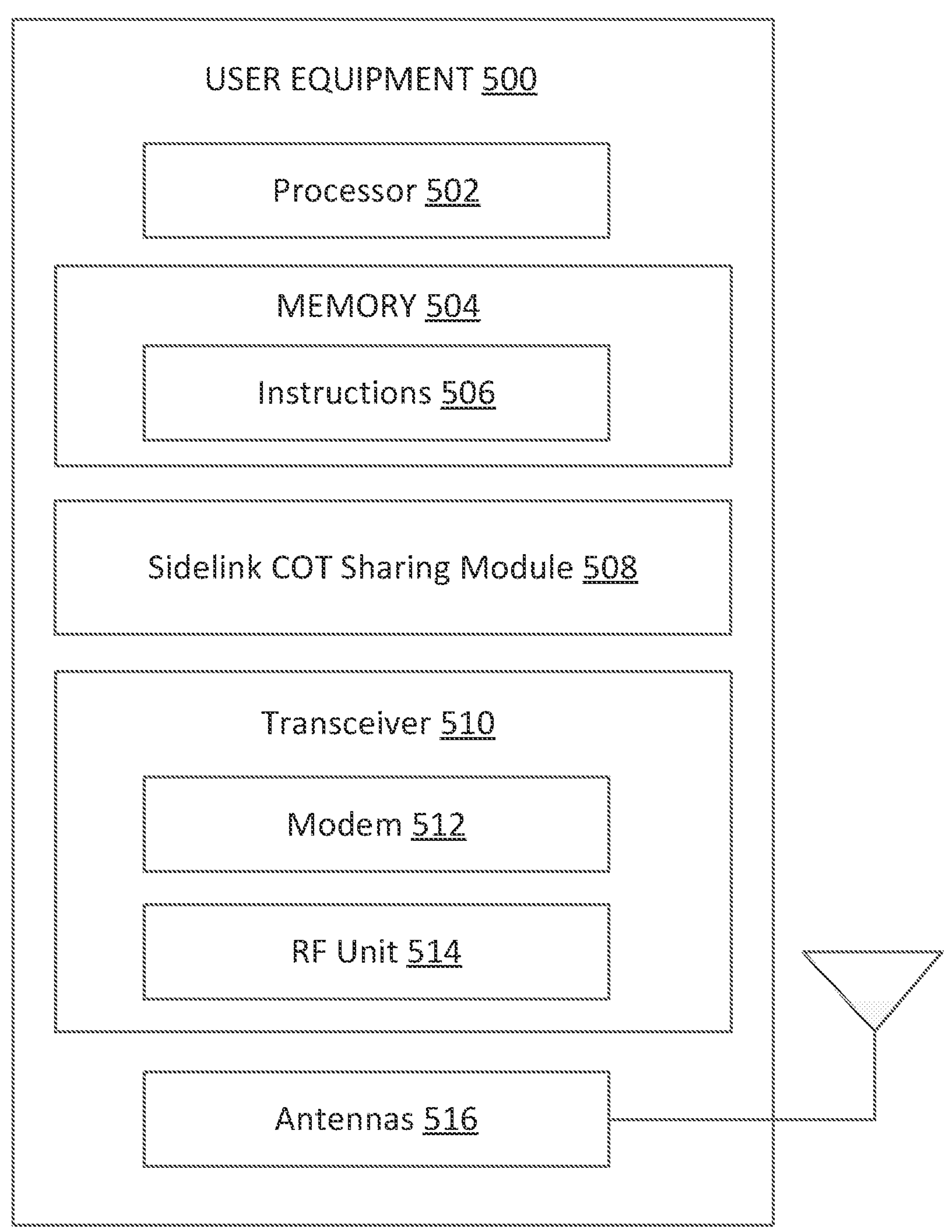
FIG. 5 is a block diagram of an exemplary user equipment (UE) according to some aspects of the present disclosure.

FIG. 5 is a block diagram of an exemplary UE 500 according to some aspects of the present disclosure. The UE 500 may be a UE 115 as discussed above with respect to FIG. 1, a UE 315 as discussed above with respect to FIG. 3, or a UE 405 as discussed above with respect to FIG. 4. As shown, the UE 500 may include a processor 502, a memory 504, a sidelink COT sharing module 508, a transceiver 510 including a modem subsystem 512 and a radio frequency (RF) unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-3, 4A-4B, 7, and 8. Instructions 506 may also be referred to as program code, which may be interpreted broadly to include any type of computer-readable statement(s). The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink COT sharing module 508 may be implemented via hardware, software, or combinations thereof. For example, the sidelink COT sharing module 508 may be implemented as a processor, circuit, and/or instructions 506 stored in the memory 504 and executed by the processor 502. In some examples, the sidelink COT sharing module 508 can be integrated within the modem subsystem 512. For example, the sidelink COT sharing module 508 can be implemented by a combination of software components (e.g., executed by a DSP or a general processor) and hardware components (e.g., logic gates and circuitry) within the modem subsystem 512.

The sidelink COT sharing module 508 may communicate with various components of the UE 500 to perform aspects of the present disclosure, for example, aspects of FIGS. 1-3, 4A-4B, 7, and 8. In some aspects, the sidelink COT sharing module 508 is configured to measure a first reference signal received power (RSRP) of a physical sidelink feedback channel (PSFCH) transmission transmitted during a channel occupancy time (COT) initiated by a second UE; and access a first slot of the COT based on the first RSRP. For example, the measured RSRP can exceed a RSRP threshold, and the sidelink COT sharing module 508 may infer that the PSFCH transmission is transmitted using the COT, for instance, via a second slot of the COT.

In some aspects, the sidelink COT sharing module 508 is configured to detect a physical sidelink shared channel (PSSCH) transmission; detect, within a COT having a plurality of slots, a physical sidelink feedback channel (PSFCH) transmission transmitted in response to the PSSCH transmission; and access a first slot of the plurality of slots of the COT based on the detecting the PSFCH transmission. In some aspects, the PSSCH transmission is a groupcast option 1 PSSCH transmission transmitted via a slot that is not part of the COT. In some aspects, the PSFCH transmission includes a hybrid automatic repeat request (HARM) negative acknowledgement (NACK) message. In some aspects, the COT is initiated by a second UE; and the PSFCH transmission is transmitted by one or more third UEs within a feedback range of the second UE.

As shown, the transceiver 510 may include the modem subsystem 512 and the RF unit 514. The transceiver 510 can be configured to communicate bi-directionally with other devices, such as the BS s 105. The modem subsystem 512 may be configured to modulate and/or encode the data from the memory 504 and/or the sidelink COT sharing module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PSCCH, PSSCH, SCI-1, SCI-2, sidelink data, COT-SI, COT sharing information such as but not limited to duration of the COT, location data of the COT-initiating UE, etc.) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may include one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., PSCCH, PSSCH, SCI-1, SCI-2, sidelink data, COT-SI, COT sharing information) to the sidelink COT sharing module 508 for processing. The antennas 516 may include multiple antennas of similar or different designs in order to sustain multiple transmission links. The RF unit 514 may configure the antennas 516.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
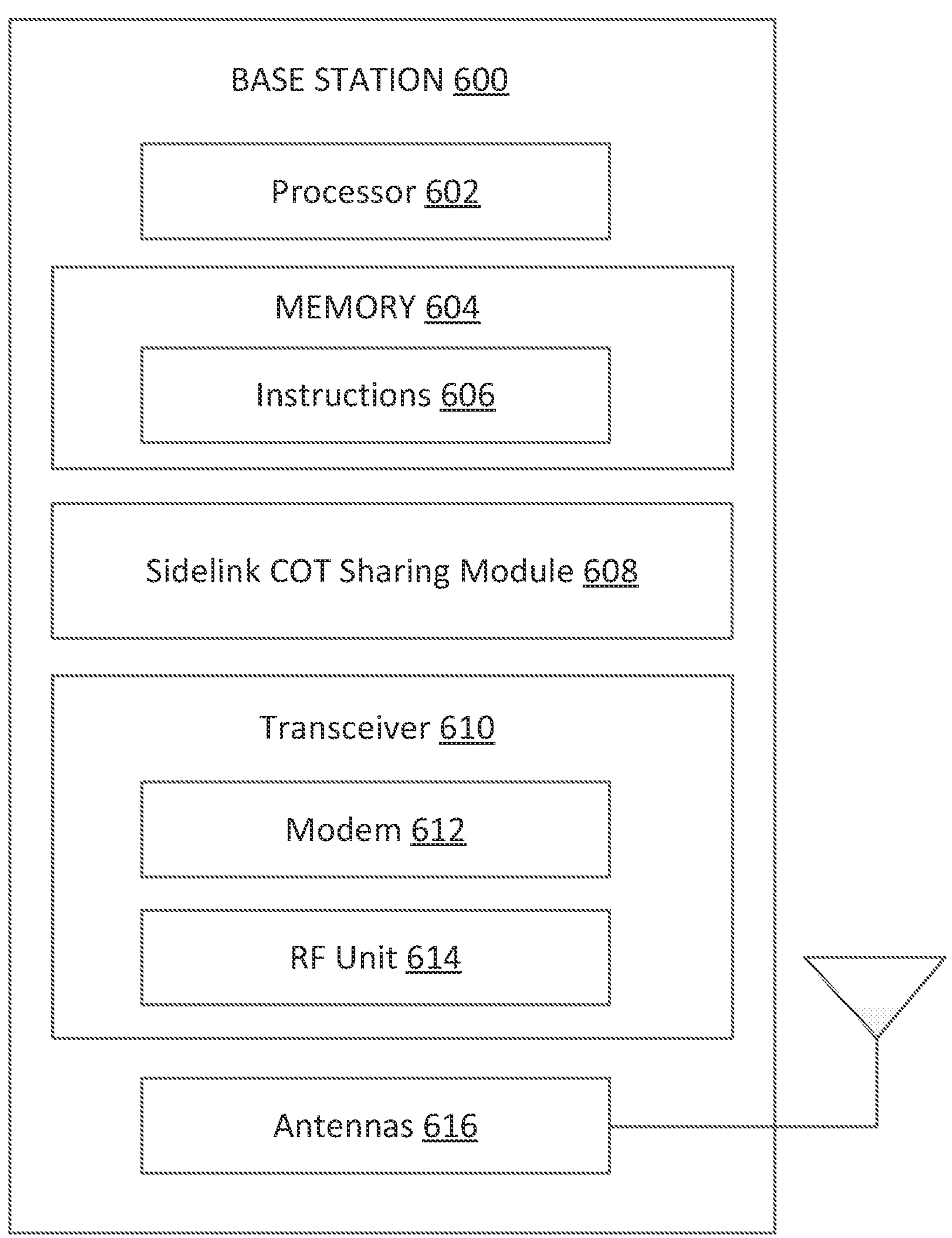
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1 or a BS 305 in the network 300. A shown, the BS 600 may include a processor 602, a memory 604, a sidelink COT sharing module 608, a transceiver 610 including a modem subsystem 612 and a RF unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein, for example, aspects of aspects of FIGS. 1-3, 4A-4B, 7, and 8. Instructions 1006 may also be referred to as program code, which may be interpreted broadly to include any type of computer-readable statement(s).

The sidelink COT sharing module 608 may be implemented via hardware, software, or combinations thereof. For example, the sidelink COT sharing module 608 may be implemented as a processor, circuit, and/or instructions 606 stored in the memory 604 and executed by the processor 602. In some examples, the sidelink COT sharing module 608 can be integrated within the modem subsystem 612. For example, the sidelink COT sharing module 608 can be implemented by a combination of software components (e.g., executed by a DSP or a general processor) and hardware components (e.g., logic gates and circuitry) within the modem subsystem 612.

The sidelink COT sharing module 608 may communicate with various components of the BS 600 to perform various aspects of the present disclosure, for example, aspects of FIGS. 1-3, 4A-4B, 7, and 8. For example, the sidelink COT sharing module 608 is configured to provide sidelink UEs with threshold RSRP values as discussed above.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.)

modulated/encoded data (e.g., RRC configuration, sidelink resource pools configurations) from the modem subsystem 612 (on outbound transmissions) or of transmissions originating from another source such as a UE 115. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 according to some aspects of the present disclosure. The antennas 616 may further receive data messages transmitted from other devices and provide the received data messages for processing and/or demodulation at the transceiver 610. The transceiver 610 may provide the demodulated and decoded data to the sidelink COT sharing module 608 for processing. The antennas 616 may include multiple antennas of similar or different designs in order to sustain multiple transmission links.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
FIG. 7 is a flow diagram of a wireless communication method according to some aspects of the present disclosure.
Figure 7:
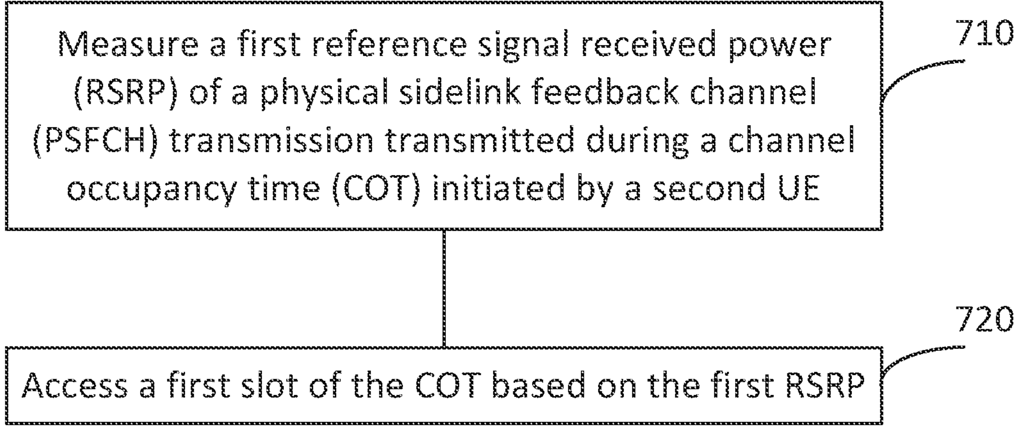

FIG. 7 is a flow diagram of a sidelink COT sharing method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UEs 115, 315, or 405 may utilize one or more components, such as the processor 502, the memory 504, the sidelink COT sharing module 508, the transceiver 510, the modem 512, and the one or more antennas 516, to execute the steps of method 700. The method 700 may employ similar mechanisms as described above in FIGS. 1-3, 4A-4B, and 5. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, in some aspects, a first UE (e.g., the UE 115, 315, or 405) measures a first reference signal received power (RSRP) of a physical sidelink feedback channel (PSFCH) transmission transmitted during a channel occupancy time (COT) initiated by a second UE.

At block 720, in some aspects, the first UE accesses a first slot of the COT based on the first RSRP.

In some aspects of method 700, the PSFCH is transmitted via a second slot of the COT reserved for PSFCH transmissions. In some aspects, the RSRP exceeds a RSRP threshold, indicating the transmission of the PSFCH transmission via a second slot of the COT. In some aspects, the RSRP threshold is pre-determined. In some aspects, the method further comprises the first UE receiving, from a new radio (NR) network to which the first UE is connected, a message indicating the RSRP threshold. In some aspects, the message is a radio resource control (RRC) message or a medium access control (MAC)-control element (CE) message. For instance, the message may be received from the NR network via a BS (e.g., BS 105, BS 600, etc.)

In some aspects, the RSRP threshold is computed by the first UE. In some aspects, the method 700 further comprises the first UE obtaining or measuring a second RSRP of an initial transmission transmitted by the second UE after initiating the COT; and adjusting the RSRP threshold based on the second RSRP. In such aspects, the RSRP threshold is adjusted to be less than the second RSRP. Further, the RSRP threshold can be adjusted to be no greater than the second RSRP.

Figure 8:
FIG. 8 is a flow diagram of a wireless communication method according to some aspects of the present disclosure.
Figure 8:
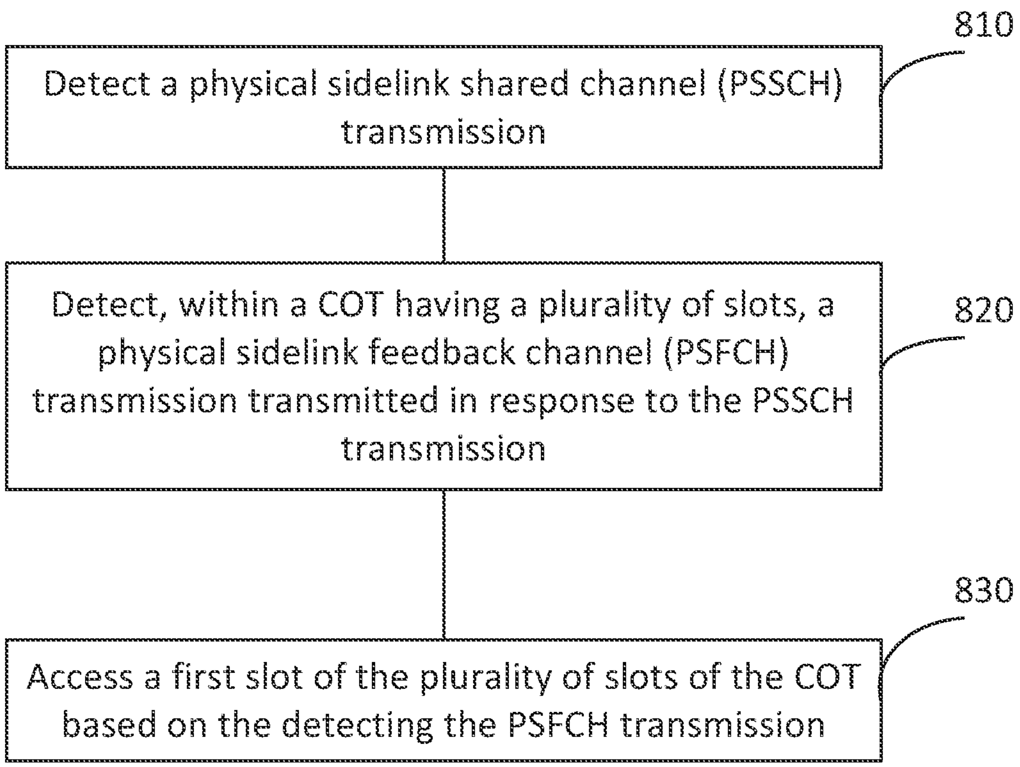

FIG. 8 is a flow diagram of a sidelink COT sharing method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UEs 115, 315, or 405 may utilize one or more components, such as the processor 502, the memory 504, the sidelink COT sharing module 508, the transceiver 510, the modem 512, and the one or more antennas 516, to execute the steps of method 800. The method 800 may employ similar mechanisms as described above in FIGS. 1-3, 4A-4B, and 5. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, in some aspects, a first UE (e.g., the UE 115, 315, or 405) detects a physical sidelink shared channel (PSSCH) transmission.

At block 820, in some aspects, the first UE detects, within a COT having a plurality of slots, a physical sidelink feedback channel (PSFCH) transmission transmitted in response to the PSSCH transmission.

At block 830, in some aspects, the first UE accesses a first slot of the plurality of slots of the COT based on the detecting the PSFCH transmission.

In some aspects of method 800, the PSSCH transmission is transmitted via a second slot of the plurality of slots of the COT. In some aspects, the PSSCH transmission is a groupcast option 1 PSSCH transmission transmitted via a slot that is not part of the COT. In such cases, the PSFCH transmission can include a hybrid automatic repeat request (HARQ) negative acknowledgement (NACK) message. In some cases, the PSFCH transmission includes a HARQ NACK message only (e.g., do not include an ACK). In some aspects, the COT is initiated by a second UE; and the PSFCH transmission is transmitted by one or more third UEs within a feedback range of the second UE. In some aspects, the first UE is within the feedback range of the second UE.

Figure 9:
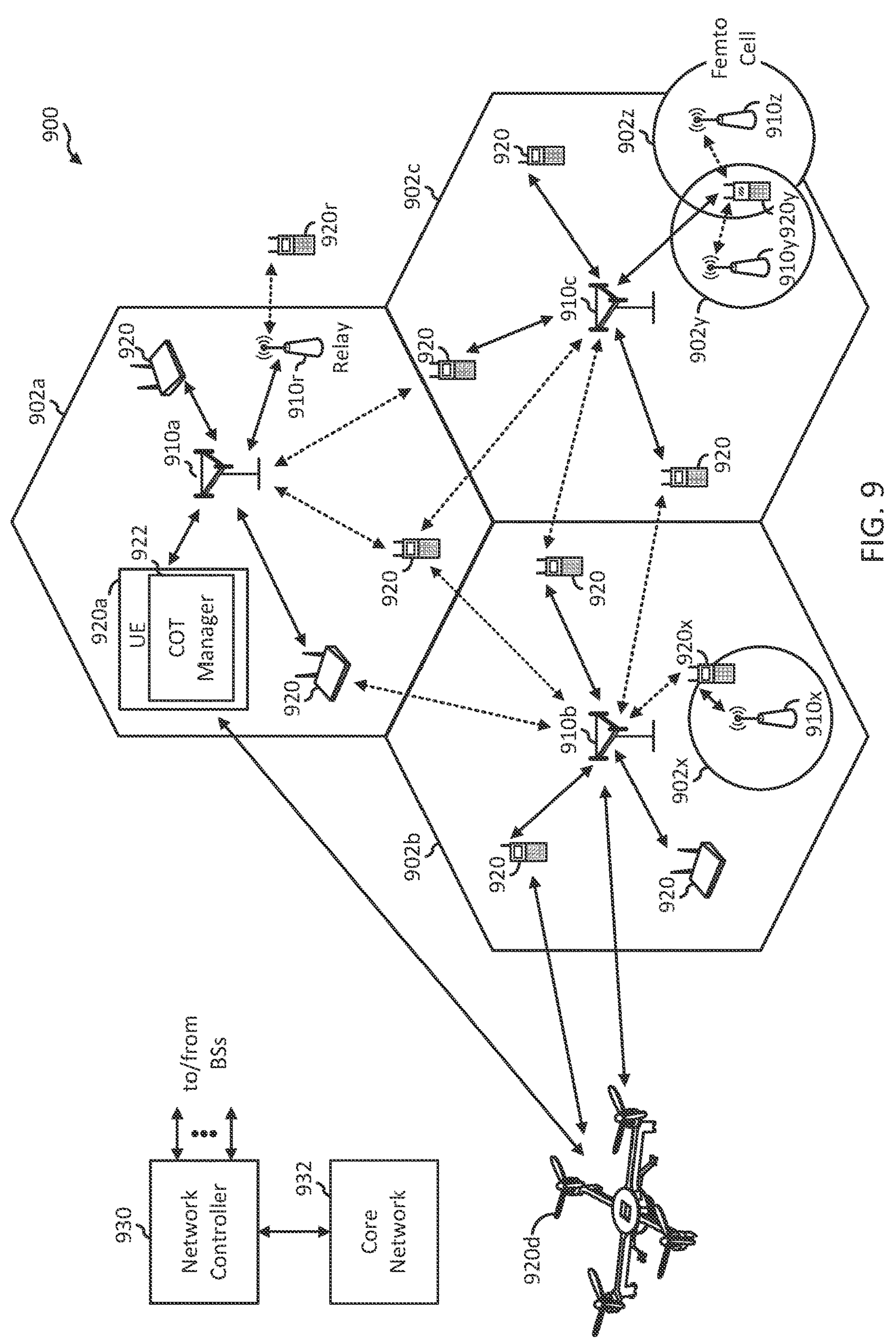
FIG. 9 is a block diagram conceptually illustrating an example wireless communication network.

FIG. 9 illustrates an example wireless communication network 900 in which aspects of the present disclosure may be performed. For example, the wireless communication network 900 may be an NR system (e.g., a 5G NR network). As shown in FIG. 9, the wireless communication network 900 may be in communication with a core network 932. The core network 932 may in communication with one or more base station (BSs) 910 and/or user equipment (UE) 920 in the wireless communication network 900 via one or more interfaces.

As illustrated in FIG. 9, the wireless communication network 900 may include a number of BSs 910*a-z* (each also individually referred to herein as BS 910 or collectively as BSs 910) and other network entities. A BS 910 may provide communication coverage for a particular geographic area, sometimes referred to as a "cell", which may be stationary or may move according to the location of a mobile BS 910. In some examples, the BSs 910 may be interconnected to one another and/or to one or more other BSs or network nodes (not shown) in wireless communication network 900 through various types of backhaul interfaces (e.g., a direct physical connection, a wireless connection, a virtual network, or the like) using any suitable transport network. In the example shown in FIG. 9, the BSs 910*a*, 910*b* and 910*c* may be macro BSs for the macro cells 902*a*, 902*b* and 902*c*, respectively. The BS 910*x* may be a pico BS for a pico cell 902*x*. The BSs 910*y* and 910*z* may be femto BSs for the femto cells 902*y* and 902*z*, respectively. A BS may support one or multiple cells.

The BSs 910 communicate with UEs 920*a*-*y* (each also individually referred to herein as UE 920 or collectively as UEs 920) in the wireless communication network 900. The UEs 920 (e.g., 920*x*, 920*y*, etc.) may be dispersed throughout the wireless communication network 900, and each UE 920 may be stationary or mobile. Wireless communication network 900 may also include relay stations (e.g., relay station 910*r*), also referred to as relays or the like, that receive a transmission of data and/or other information from an upstream station (e.g., a BS 910*a* or a UE 920*r*) and sends a transmission of the data and/or other information to a downstream station (e.g., a UE 920 or a BS 910), or that relays transmissions between UEs 920, to facilitate communication between devices.

A network controller 930 may be in communication with a set of BSs 910 and provide coordination and control for these BSs 910 (e.g., via a backhaul). In aspects, the network controller 930 may be in communication with a core network 932 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

According to certain aspects, the UEs 920 may be configured for transmitting feedback information on a sidelink feedback channel in an unlicensed spectrum, according to certain aspects as described herein. For example, as shown in FIG. 9, the UE 920*a* includes a channel occupancy time (COT) manager 922. The COT manager 922 may be configured to perform the operations illustrated in FIG. 18, as well as other operations described herein for improved COT sharing for sidelink unlicensed operation.

Figure 10:
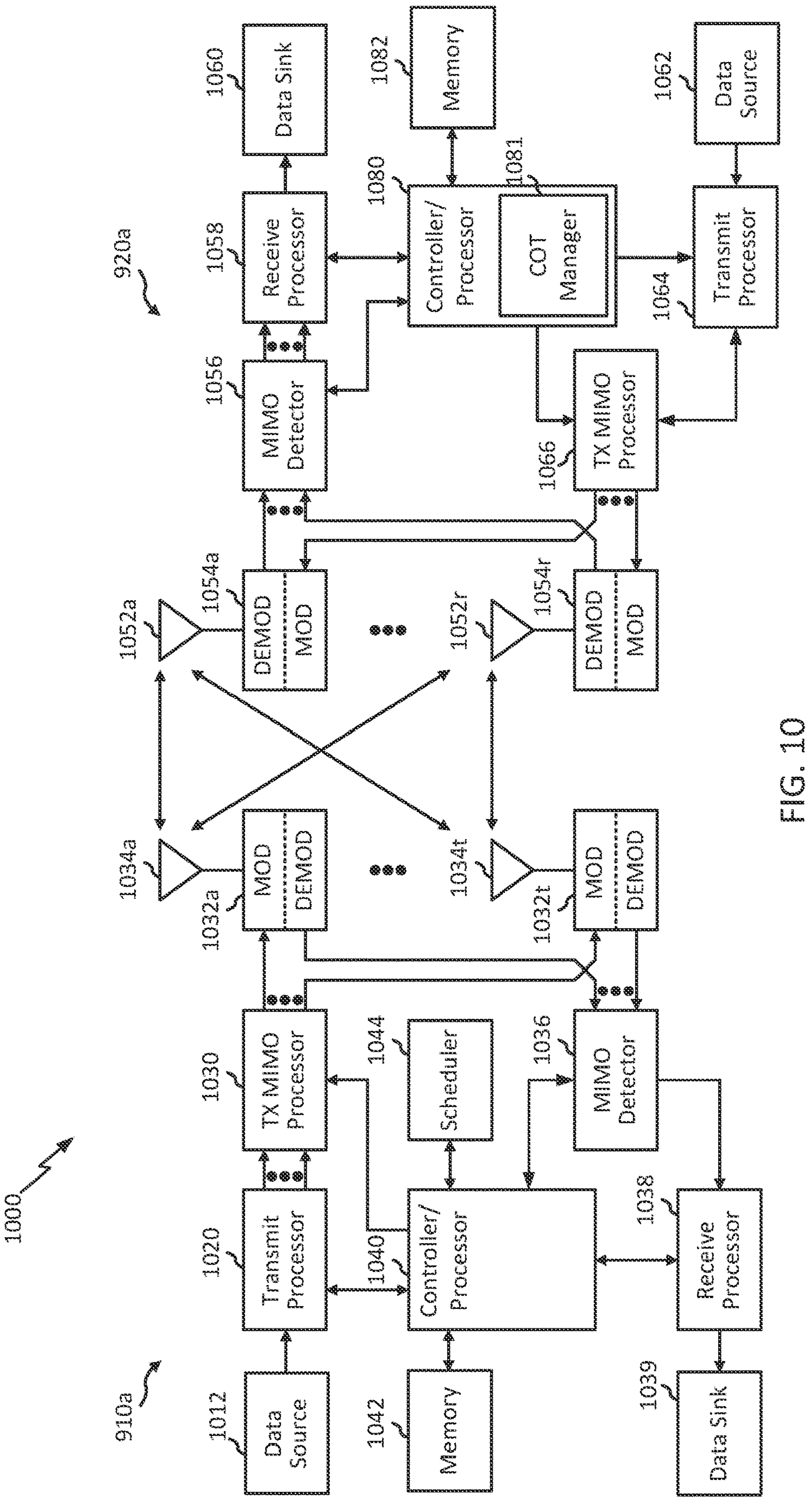
FIG. 10 is a block diagram conceptually illustrating a design of an example a base station (BS) and user equipment (UE) according to some aspects of the present disclosure.

FIG. 10 illustrates example components of BS 910*a* and UE 920*a* (e.g., the wireless communication network 900 of FIG. 9), which may be used to implement aspects of the present disclosure.

At the BS 910*a*, a transmit processor 1020 may receive data from a data source 1012 and control information from a controller/processor 1040. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 1020 may process (e.g., encode and symbol map) the data and control information to obtain data symbols and control symbols, respectively. The transmit processor 1020 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) in transceivers 1032*a*-1032*t*. Each modulator in transceivers 1032*a*-1032*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 1032*a*-1032*t* may be transmitted via the antennas 1034*a*-1034*t*, respectively.

At the UE 920*a*, the antennas 1052*a*-1052*r* may receive the downlink signals from the BS 910*a* and may provide received signals to the demodulators (DEMODs) in transceivers 1054*a*-1054*r*, respectively. Each demodulator in transceivers 1054*a*-1054*r* may condition (e.g., filter, amplify, downconvert, and digitize) a respective received signal to obtain input samples. Each demodulator may further process the input samples (e.g., for OFDM, etc.) to obtain received symbols. A MIMO detector 1056 may obtain received symbols from all the demodulators in transceivers 1054*a*-1054*r*, perform MIMO detection on the received symbols if applicable, and provide detected symbols. A receive processor 1058 may process (e.g., demodulate, deinterleave, and decode) the detected symbols, provide decoded data for the UE 920*a* to a data sink 1060, and provide decoded control information to a controller/processor 1080.

On the uplink, at UE 920*a*, a transmit processor 1064 may receive and process data (e.g., for the physical uplink shared channel (PUSCH)) from a data source 1062 and control information (e.g., for the physical uplink control channel (PUCCH) from the controller/processor 1080. The transmit processor 1064 may also generate reference symbols for a reference signal (e.g., for the sounding reference signal (SRS)). The symbols from the transmit processor 1064 may be precoded by a TX MIMO processor 1066 if applicable, further processed by the modulators in transceivers 1054*a*-1054*r* (e.g., for SC-FDM, etc.), and transmitted to the BS 910*a*. At the BS 910*a*, the uplink signals from the UE 920*a* may be received by the antennas 1034, processed by the modulators in transceivers 1032*a*-1032*t*, detected by a MIMO detector 1036 if applicable, and further processed by a receive processor 1038 to obtain decoded data and control information sent by the UE 920*a*. The receive processor 1038 may provide the decoded data to a data sink 1039 and the decoded control information to the controller/processor 1040.

The memories 1042 and 1082 may store data and program codes for BS 910*a* and UE 920*a*, respectively. A scheduler 1044 may schedule UEs for data transmission on the downlink and/or uplink.

Antennas 1052, processors 1066, 1058, 1064, and/or controller/processor 1080 of the UE 920*a* and/or antennas 1034, processors 1020, 1030, 1038, and/or controller/processor 1040 of the BS 910*a* may be used to perform the various techniques and methods described herein. As shown in FIG. 10, the controller/processor 1080 of the UE 920*a* has COT manager 1081 that may be configured to perform the operations illustrated in FIG. 18, as well as other operations disclosed herein for improved COT sharing for sidelink unlicensed operation. Although shown at the controller/processor, other components of the UE 920*a* and BS 910*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RB s. NR may support a base subcarrier spacing (SCS) of 15 KHz and other SCS may be defined with respect to the base SCS (e.g., 30 kHz, 60 kHz, 120 kHz, 240 kHz, etc.).

Figure 11:
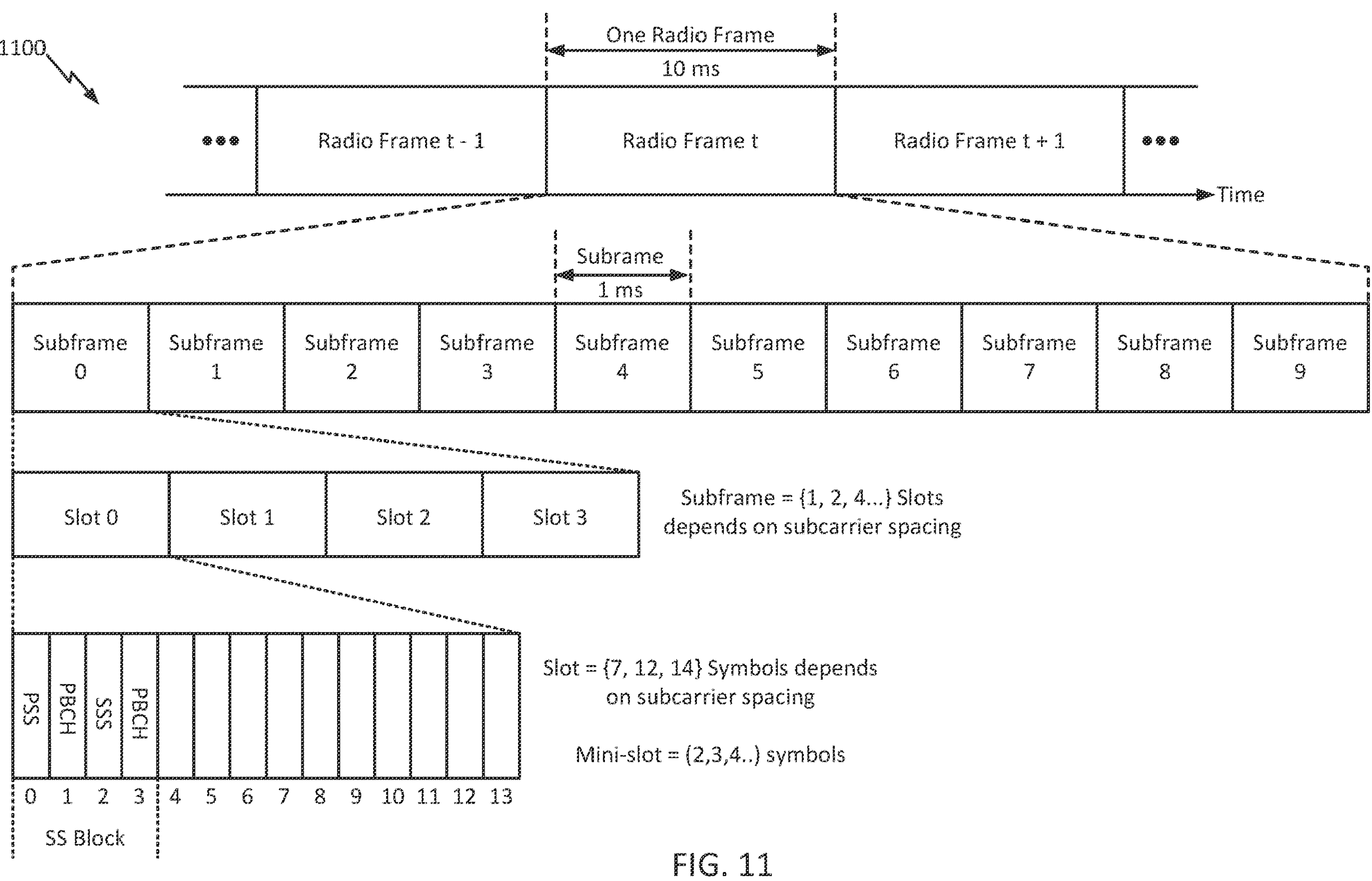
FIG. 11 is an example frame format for certain wireless communication systems (e.g., new radio (NR)) according to some aspects of the present disclosure.

FIG. 11 is a diagram showing an example of a frame format 1100 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 11. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIB s), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Sidelink Communication

In some examples, two or more subordinate entities (e.g., UEs 920) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 920*a*) to another subordinate entity (e.g., another UE 920) without relaying that communication through the scheduling entity (e.g., UE 920 or BS 910), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as acknowledgement (ACK) and or negative ACK (NACK) information corresponding to transmissions on the PSSCH. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

Figures 12A, 12B:
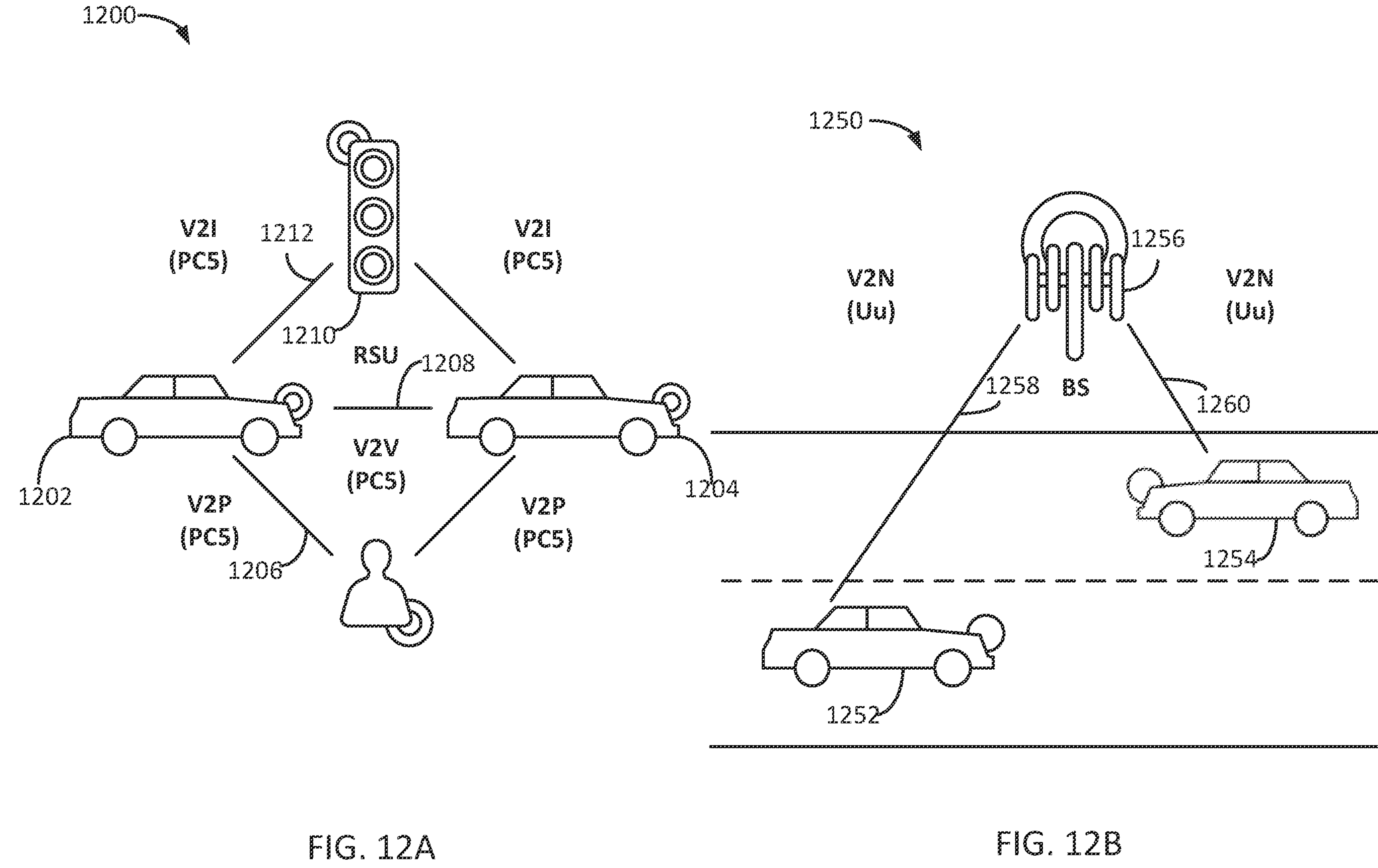
FIG. 12A and FIG. 12B show diagrammatic representations of example vehicle to everything (V2X) systems according to some aspects of the present disclosure.

FIG. 12A and FIG. 12B show diagrammatic representations of example V2X systems, in accordance with some aspects of the present disclosure. For example, the vehicles shown in FIG. 12A and FIG. 12B may communicate via sidelink channels and may relay sidelink transmissions as described herein.

The V2X systems provided in FIG. 12A and FIG. 12B provide two complementary transmission modes. A first transmission mode (also referred to as mode 4), shown by way of example in FIG. 12A, involves direct communications (for example, also referred to as sidelink communications) between participants in proximity to one another in a local area. A second transmission mode (also referred to as mode 3), shown by way of example in FIG. 12B, involves network communications through a network, which may be implemented over a Uu interface (for example, a wireless communication interface between a radio access network (RAN) and a UE).

Referring to FIG. 12A, a V2X system 1200 (for example, including vehicle-to-vehicle (V2V) communications) is illustrated with two vehicles 1202, 1204. The first transmission mode allows for direct communication between different participants in a given geographic location. As illustrated, a vehicle can have a wireless communication link 1206 with an individual (V2P) (for example, via a UE) through a PC5 interface. Communications between the vehicles 1202 and 1204 may also occur through a PC5 interface 1208. In a like manner, communication may occur from a vehicle 1202 to other highway components (for example, highway component 1210), such as a traffic signal or sign (V2I) through a PC5 interface 1212. With respect to each communication link illustrated in FIG. 12A, two-way communication may take place between elements, therefore each element may be a transmitter and a receiver of information. The V2X system 1200 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 12B shows a V2X system 1250 for communication between a vehicle 1252 and a vehicle 1254 through a network entity 1256. These network communications may occur through discrete nodes, such as a BS (e.g., the BS 910*a*), that sends and receives information to and from (for example, relays information between) vehicles 1252, 1254. The network communications through vehicle to network (V2N) links 1258 and 1260 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Example Sidelink Feedback Channel Resource Mapping in Unlicensed Spectrum

When communicating on a sidelink a UE may use resources selected from a resource pool. The resource pool may be defined as a consecutive number of resource blocks (RBs) in the frequency domain in units of sub-channels. In other words, a resource pool may be composed of a plurality of consecutive RBs in frequency. In particular, a sub-channel may be defined as one or more of the RBs (e.g., that are consecutive), and a resource pool may be defined as one or more sub-channels.

Figure 13:
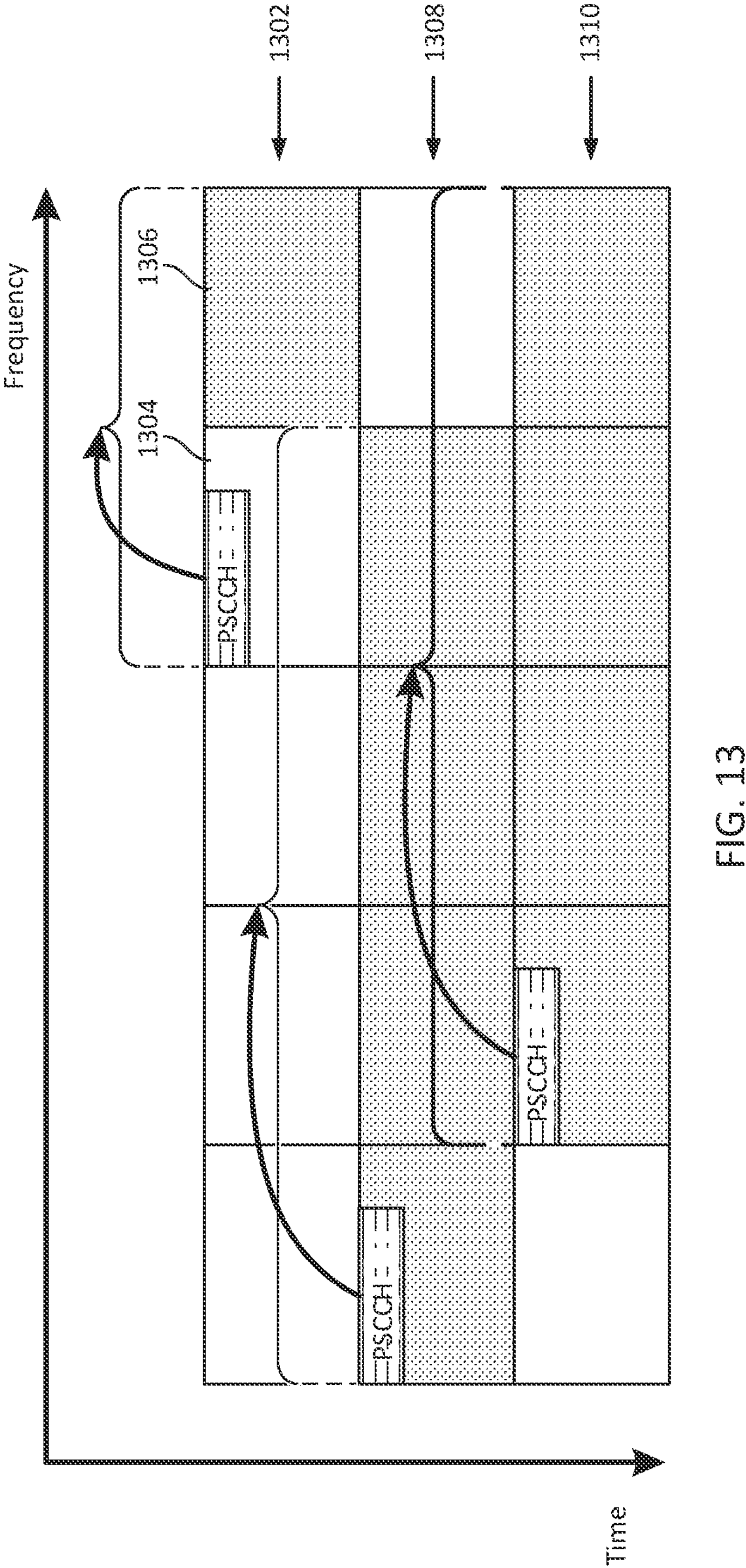
FIG. 13 shows a time-frequency grid illustrating example resource pools for sidelink communication according to some aspects of the present disclosure.

FIG. 13 shows a time-frequency grid illustrating example resource pools for sidelink communication, according to certain aspects presented here. As can be seen, three different resource pools (e.g., 1302, 1304, and 1306) are shown. The resource pool 1302 may be composed of two sub-channels 1308 (e.g., assigned a physical sidelink control channel (PSCCH) and a physical sidelink shared channel (PSSCH)) and 1310 (e.g., assigned to the PSSCH), each of the two sub-channels 1308 and 1310 including a consecutive set of RBs spanning different frequencies. As shown, resources pool 1304 and 1306 may each include four sub-channels spanning different frequency bands.

In some cases, a sidelink resource pool may be defined by a number of parameters, such as the parameters sl-StartRB-Subchannel, sl-SubchannelSize, and sl-NumSubchannel, though it should be noted that they can be referred to in any suitable way. The parameter sl-StartRB-Subchannel may define the first RB of the lowest index sub-channel of the resource pool. For example, with reference to resource pool 1302, the parameter sl-StartRB-Subchannel may specify the first RB of the sub-channel 1308. Additionally, the parameter sl-SubchannelSize may define the number of RBs of each sub-channel in the resource pool and the parameter sl-NumSubchannel may define the number of sub-channels in the resource pool. Accordingly, for example, with reference to resource pool 1302, the parameter sl-NumSubchannel may define resource pool 1302 to include two sub-channels (e.g., 1308 and 1310) and the parameter sl-SubchannelSize may define that each of sub-channels 1308 and 1310 include 10 RBs to 100 RBs.

In some cases, within each sub-channel, a sidelink control channel, such as a physical sidelink control channel (PSCCH), may occupy a first number of RBs (e.g., where the number is the value of the parameter sl-FreqResourcePSCCH) and a first number of symbols (e.g., where the number is the value of a parameter sl-TimeResourcePSCCH) of the first sub-channel assigned to a sidelink shared data channel, such as a physical sidelink shared channel (PSSCH). In some cases, control information included in the PSCCH may allocate, starting from a current sub-channel in which the PSCCH is transmitted, how many sub-channels may be included within the PSSCH.

In some cases, a UE may need to transmit feedback information to indicate whether certain transmissions on a PSSCH and/or PSCCH have been successfully received or not. This feedback information may include acknowledgement (ACK) that a transmission was successfully received and decoded and/or negative ACK (NACK) that a transmission was not successfully decoded corresponding to the transmissions on the PSSCH/PSCCH. In some cases, this feedback information may be transmitted on a feedback channel, known as a physical sidelink feedback channel (PSFCH). In order to transmit feedback information on the PSFCH, a set of resources may be selected from a non-dedicated PSFCH resource pool.

Figure 14:
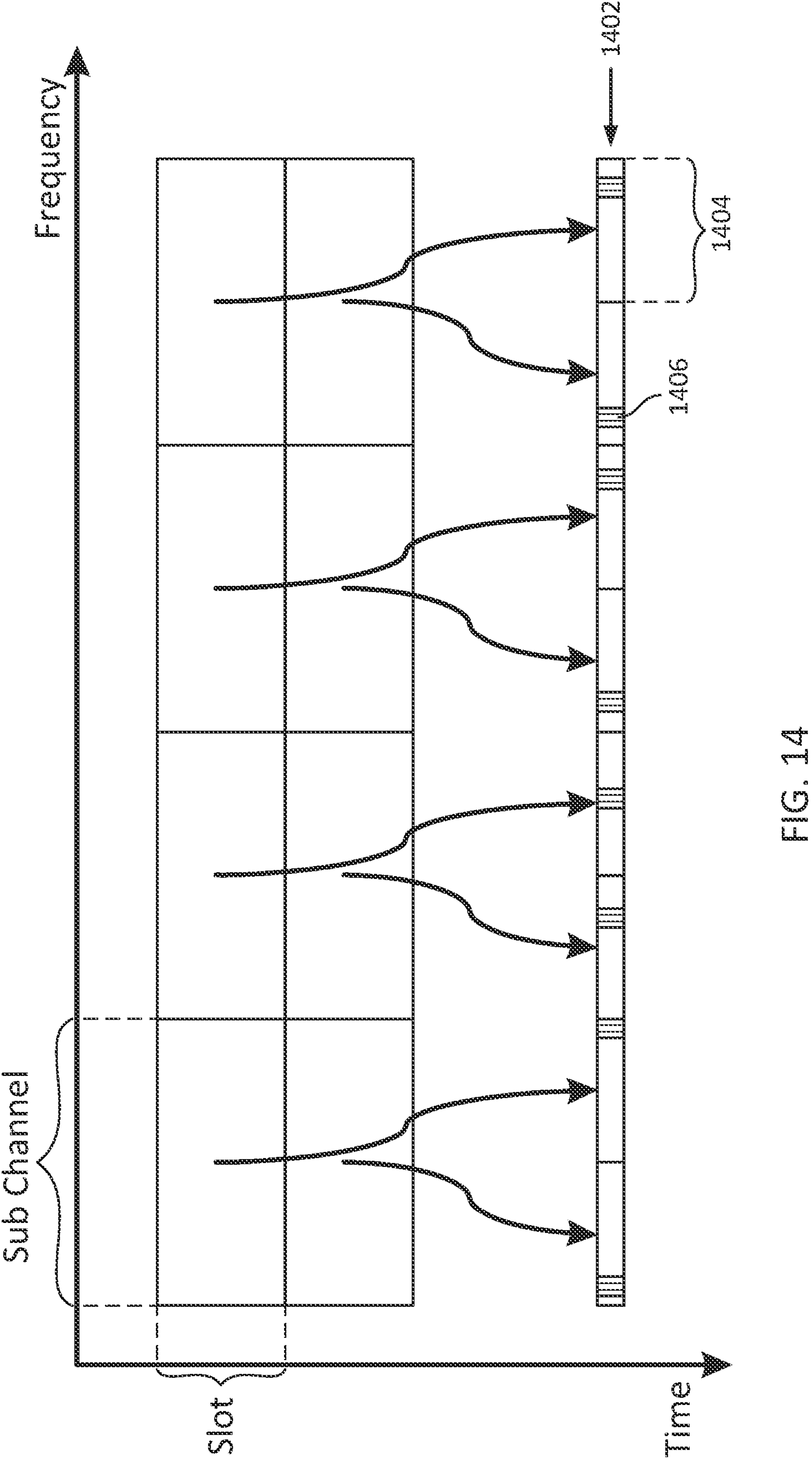
FIG. 14 illustrates an example sidelink feedback channel resource pool mapping according to some aspects of the present disclosure.

An example PSFCH resource pool 1402 is illustrated in FIG. 14. As shown, the PSFCH resource pool 1402 may be separated into a set of separate sub-resource pools 1404 each corresponding to a different sidelink sub-channels across different time slots. Though certain aspects are described in terms of slots, other appropriate time durations may similarly be used. For example, as shown in FIG. 14, a total of eight sub-channels across two time slots may be used to carry PSSCH/PSCCH information. Accordingly, the PSFCH resource pool 1402 may be separated into eight different sub-resource pools 1404 for carrying feedback information corresponding to the eight different sub-channels across the two time slots. Each sub-resource pool 1404 may include a plurality of resources (e.g., RBs) and the UE may select one resource 1406 of the plurality of resources within the sub-resource pool 1404 to transmit the feedback information for each sub-channel.

The UE may determine the PSFCH resource pool and select resources for transmitting the feedback information based on a number of parameters. Though certain names are given for such parameters, it should be noted they may be referred to in any suitable manner. For example, in some cases, the UE may be configured with the parameter periodPSFCHresource, which may indicate a period in slots for PSFCH transmission in a resource pool. In some cases, the supported periods are 0/1/2/4, where 0 means no PSFCH. In certain aspects, PSFCH transmission timing may be determined to be the first slot with PSFCH resources after reception of a PSSCH and after MinTimeGapPSFCH (e.g., a time value) after PSSCH. In some cases, the parameter $$M_{PRB,set}^{PSFCH}$$

may defines a set of PRBs for PSFCH in a slot. As discussed above, this set of PRBs may be split between $$N_{PSSCH}^{PSFCH}$$

(e.g., the number of PSSCH slots corresponding to the PSFCH slot) and $N_{subch}$ PSSCH (e.g., the number of PSSCH sub-channels) in a slot. Accordingly, each sub-channel/slot may have $$M_{subch,slot}^{PSFCH} = \frac{M_{PRB,set}^{PSFCH}}{N_{PSSCH}^{PSFCH} \times N_{subch}}$$

PRBs for PSFCH. In some cases, mapping may be performed time-first from PSSCH resource to PSFCH PRBs.

A size of the PSFCH resource pool may be defined according to $$R_{PRB,CS}^{PSFCH} = N_{type}^{PSFCH} \times N_{CS}^{PSFCH} \times M_{subch,slot}^{PSFCH},$$

where $$N_{CS}^{PSFCH}$$

is the number of cyclic shift (CS) pairs configured per RB in the resource pool (e.g., where the pair is for a 1 bit ACK/NACK). In certain aspects $$N_{type}^{PSFCH}$$

is 1 or $$N_{subch}^{PSSCH},$$

indicating for the sub-channels in a PSSCH slot whether the PSFCH resource pool is shared or not. In some cases, within the pool, the PSFCH resources may be indexed in PRB index, then in CS pair index.

In some cases, the UE may determine a PSFCH resource to use for transmitting the feedback information according to $$(P_D + M_{ID}) \bmod R_{PRB,CS}^{PSFCH},$$

where $P_{ID}$ is a physical source ID from sidelink control information (SCI) 0-2 for PSSCH and $M_{ID}$ is 0 or identifies the UE receiving the PSSCH. In certain aspects, for unicast or NAK based transmission, $M_{ID}$=0 and the UE may send ACK or NAK only at a source ID dependent resource in the pool. For group cast, in certain aspects, a destination ID may be used to select one resource in the resource pool for transmitting the feedback information.

In some cases, it may be beneficial to perform sidelink communication using wideband channel operation within an unlicensed spectrum in order to take advantage of globally-available "free" spectrum. However, the allocation of resources in the unlicensed spectrum may be different from that of sidelink communication.

For example, for operation in an unlicensed spectrum, as there may be an issue with coexistence with WiFi, channel access in the unlicensed spectrum may be divided among a plurality of 20 MHz subbands, even when the system is operating in wideband mode (e.g., multiples of 20 MHz). To be able to access a particular 20 MHz subband, a wireless device (e.g., UE) may first perform a listen before talk (LBT) procedure to determine whether that 20 MHz subband is available for use by the wireless device. A 20 MHz subband may be available for use if the wireless device senses that there are no other transmissions occurring in this 20 MHz subband for a period of time, indicating that the MHz subband is in an idle state. In some cases, the wireless device may conclude that the 20 MHz subband is in the idle state by sensing an energy level on the 20 MHz subband. If the energy level of the 20 MHz subband is below a threshold, the wireless device may conclude that the 20 MHz subband is available for use. If, however, the LBT procedure does not pass (e.g., an energy level of the 20 MHz subband is greater than a threshold), the wireless device may try another 20 MHz bandwidth part. It should be noted that a 20 MHz subband is only an example, and a subband may have a different bandwidth.

Figure 15:
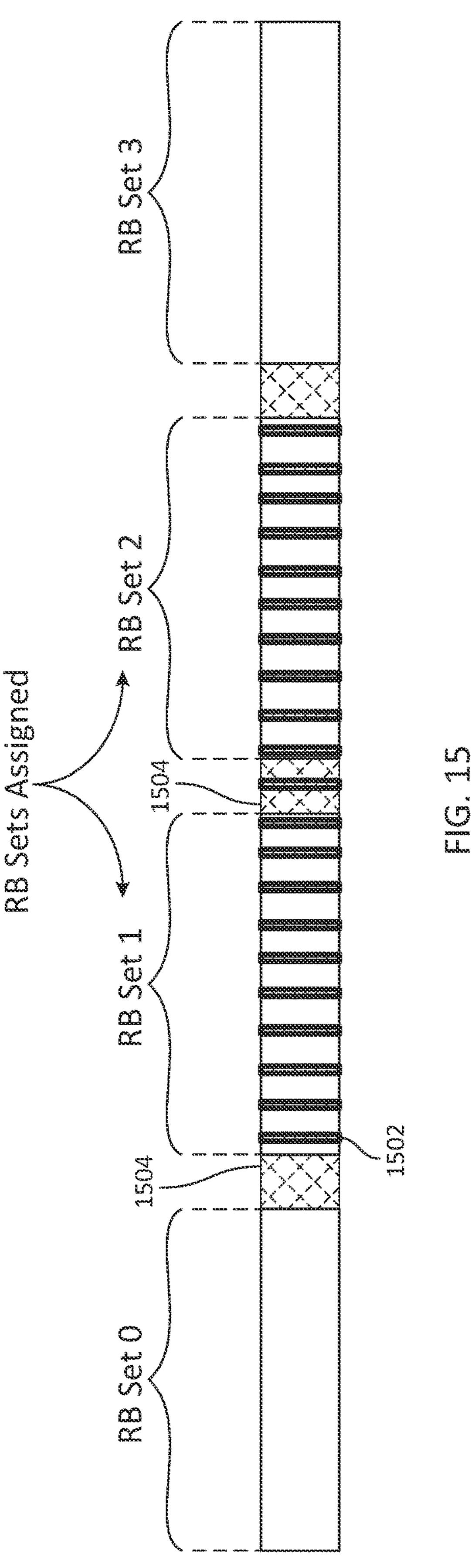
FIG. 15 illustrates an example resource allocation in an unlicensed spectrum according to some aspects of the present disclosure.

To support this type of operation, such as in 5G new radio-unlicensed (NR-U), an intra-cell guard band is introduced to define guard band between each (e.g., approximately 20 MHz) subbands. The passband between two adjacent intra-cell guard bands may be known as an "RB set," which is approximately 20 MHz. For example, as illustrated in FIG. 15, the unlicensed spectrum may be split up into a plurality of RB sets, (e.g., each spanning roughly 20 MHz of bandwidth) including a plurality of RBs 1502. As shown in the example illustrated in FIG. 15, the unlicensed spectrum may be divided into four different RB sets, including RB set 0, RB set 1, RB set 2, and RB set 3, and intra-cell guard bands 1504 may be inserted between each RB set. It should be noted there may be a greater or lesser number of RB sets, and they may have a greater or lesser bandwidth/number of RBs. As noted above, to communicate using the unlicensed spectrum, a wireless device may perform a LBT procedure to sense which RB sets are available for communication. As shown in FIG. 15, RB set 1 and RB set 2 have passed the LBT procedure and are available for use/assignment by the wireless device.

In some cases, a (e.g., NR-U) system may support both contiguous and interlaced uplink resource allocations while complying with regulations. In the interlaced uplink resource allocation, the basic unit of resource allocation for the NR unlicensed channels is an interlace, which, for example, as illustrated in FIG. 15, is composed of ten equally spaced RBs 1502 within a 20 MHz frequency bandwidth (e.g., RB set) for 15 KHz sub-carrier spacing. In certain aspects, for RBs that belong to an assigned set of interlaces but that fall in an intra-cell guard band, such RBs will be assigned only if the RB sets on both sides are assigned. Further, in some cases a wireless device, such as a UE, may transmit in the intra-cell guard band 1504 if both RB sets on either side of the intra-cell guard band are allocated to the UE. Likewise, in some cases, a UE may also receive transmissions within the intra-cell guard band 1504 if the UE is a high-capability UE. However, if the UE is a lower-capability UE, the UE may only be able to receive transmissions within an RB set and may not receive transmissions in the intra-cell guard band 1504. In some cases, a UE may transmit information to a base station, indicating a capability of the UE. If the capability information indicates that the UE is a low-capability UE, the base station may avoid scheduling a physical data shared channel (PDSCH) on guard band RBs to this low-capability UE.

As noted above, it may be beneficial to perform sidelink communication using wideband channel operation within an unlicensed spectrum in order to take advantage of globally-available "free" spectrum. However, an issue that may exist with performing sidelink communication in the unlicensed spectrum is due to the way in which sidelink sub-channels are defined with respect to the way in which RB sets are defined within the unlicensed spectrum. For example, as noted above, sub-channels in the sidelink may be defined consecutively, without any spacing between different sub-channels. This presents an issue when mapping these consecutively-defined sub-channels to RB sets in the unlicensed band that include intra-cell guard bands disposed between RB sets. For example, if the sidelink sub-channels are defined in a legacy fashion in which the sub-channels are consecutive, some sidelink sub-channels may partially overlap with intra-cell guard bands in the unlicensed spectrum, which may lead to these sidelink sub-channel being unusable by certain UEs (e.g., low-capability UEs) in the unlicensed spectrum. Thus, in some case, to help alleviate these issues, side-link sub-channels may be confined within RB sets of the unlicensed spectrum, such that no sidelink sub-channel overlaps an intra-cell guard band. Thus, by confining the sidelink sub-channels to fit within RB sets of the unlicensed spectrum usage of each sidelink sub-channel only depends on the LBT of the RB set in which that sidelink sub-channel is confined.

Additionally, in some cases (e.g., NR-U), the concept of channel occupancy time (COT) sharing has been introduced such that a COT on a particular subband (e.g., RB set) acquired by a transmitter device (e.g., UE) via a passing LBT procedure on that subband may be shared with another device (e.g., UE). For example, a COT for a frequency band/subband may designate an interval of time that a transmitter device can transmit via the frequency band continuously before yielding the channel, e.g., stopping transmitting via the frequency band for a period to allow another device to possibly perform a LBT and begin transmitting via the frequency band.

In some cases, a COT for a frequency band may be limited by regulations to a certain time interval that may depend on the market, the frequency band, technical considerations such as priority of the signal, and duration of the corresponding LBT procedure (typically, the larger the duration of the LBT procedure, the greater the corresponding COT). In some cases, a duration of the COT is typically in the range of 2 to 10 ms, which may correspond to 4 to 20 slots in NR V2X with 30 KHz subcarrier spacing.

In some cases, a COT may be shared by multiple sidelink UEs. In COT sharing, one sidelink UE acquires the COT by performing an LBT (e.g., a category 4 (Cat4) or type 1 LBT). Thereafter, other sidelink UEs that are in proximity of the "COT-initiating" UE may realize that a COT has been initiated and may proceed to perform transmissions within a remaining portion of the COT, either by skipping LBT altogether or by first performing a "light" (i.e., deterministic duration) LBT (e.g., cat-2 or Type 2 LBT). In some cases, the "COT-initiating" sidelink UE may inform the other sidelink UEs of the initiated COT by transmitting sidelink control information (SCI) to the other UEs that indicates at least an ending time associated with the COT.

COT sharing may come in at least two varieties: TDM style COT sharing, where a COT is shared by time multiplexing (e.g., UEs transmit one after another until the COT duration is exhausted), and FDM style COT sharing, where a COT is shared by frequency multiplexing (e.g., UEs transmit simultaneously on different sub-channels of a frequency band to which the COT applies). In some cases, the two varieties of COT sharing can also be combined.

This concept of COT sharing may also be applicable to transmission of feedback information on a sidelink feedback channel. For example, in some cases, after performing LBT to acquire a COT on a particular RB set and transmitting a PSCCH/PSSCH, a transmitting node (e.g., UE) may share the COT with a responding node, allowing the responding node to transmit feedback information in a PSFCH using the same COT.

Example ACK Transmission for Improved COT Sharing

As noted above, sidelink UEs may share a COT to perform transmissions. When a COT is initiated it must be continuously utilized. If transmission stops prior the end of a COT for a threshold amount of time, the COT may be effectively released and subsequent transmissions may need to be performed in a new COT, acquired by a new LBT procedure. For example, regulation typically allows for small duration transmission gaps in the order of 16 microseconds to 25 microseconds before a COT is effectively released. Accordingly, for COT-sharing, this means that a sidelink device not only needs to be aware of the COT duration (e.g., expiration time) but also whether, at the time a sidelink device chooses to utilize the shared COT, the COT is still active (e.g., transmissions have not stopped after the COT was first initiated).

Figure 16:
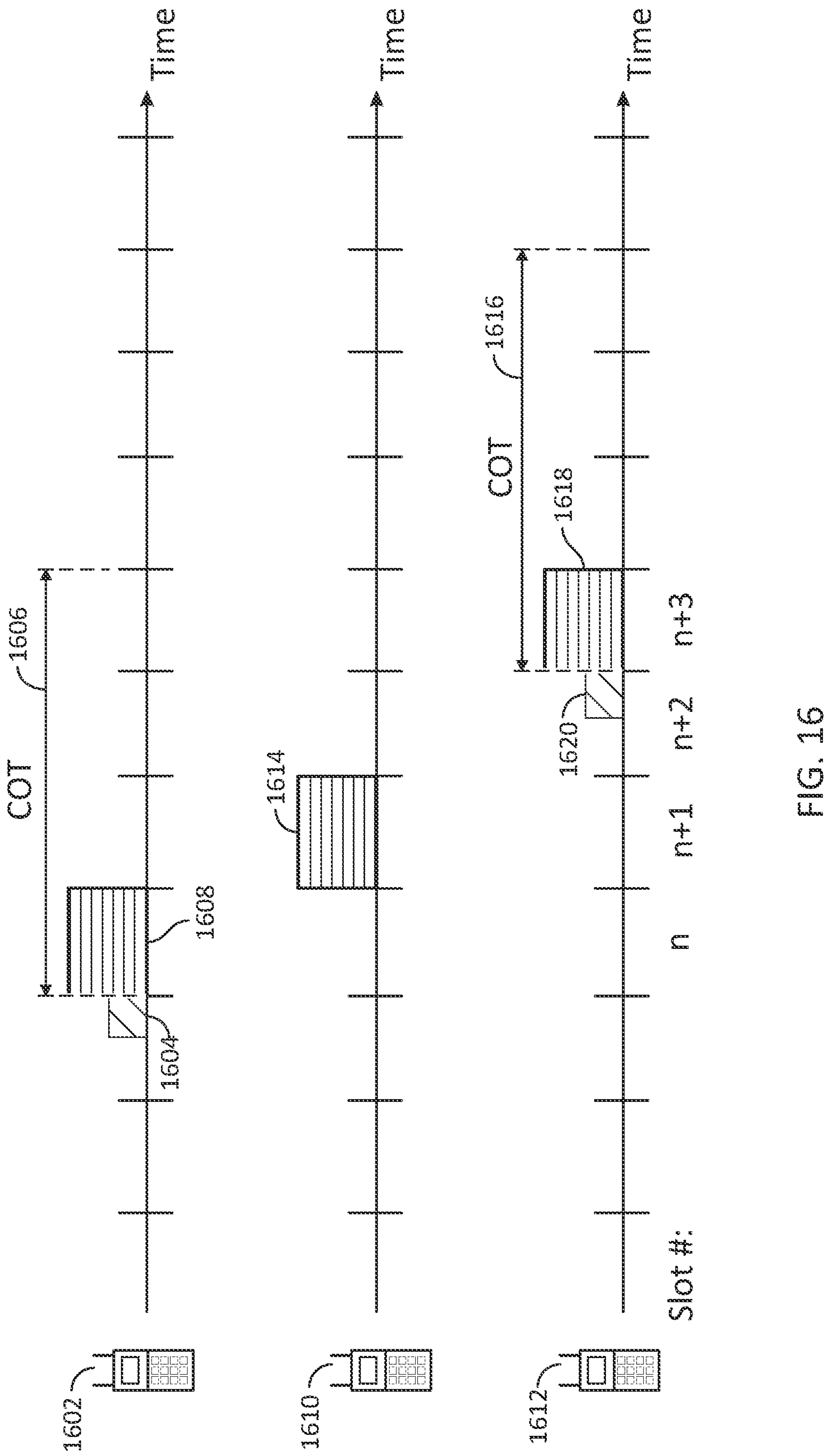
FIG. 16 illustrates an example timeline for channel occupancy time (COT) sharing according to some aspects of the present disclosure.

FIG. 16 illustrates an example timeline for COT sharing. As illustrated, a first sidelink UE 1602 may desire to transmit information in slot n on a particular subband or channel in an unlicensed spectrum. As there is no active COT for a transmission in slot n, the first sidelink UE 1602 may perform a LBT procedure 1604 to determine whether channel is available (e.g., free of transmissions). In some cases, the LBT procedure 1604 may comprise a category 4 LBT procedure and may be performed by the first sidelink UE 1602 prior to slot n, as shown. In the example shown in FIG. 16, the LBT procedure 1604 may identify the channel as idle/available. In response to the channel being identified as idle/available, the first sidelink UE 1602 may initiate a COT 1606 for performing transmissions. As shown, the COT 1606 may have a duration of several slots, such as four slots. That is, as shown, the COT 1606 may have a duration that spans slot n, slot n+1, slot n+2, and slot n+3.

After initiating the COT 1606, the first sidelink UE 1602 may perform one or more sidelink transmissions 1608 in slot n. In some cases, the one or more sidelink transmissions 1608 may include a sidelink control information (SCI) transmission. The SCI transmission may include information for indicating that the COT 1606 has been initiated by the first sidelink UE 1602 and the duration of the COT 1606 (e.g., an expiration time associated with the COT 1606). The one or more sidelink transmissions 1608 (including the SCI transmission) may be received by other UEs, such as the second sidelink UE 1610 and the third sidelink UE 1612.

In the example illustrated in FIG. 16, the second sidelink UE has previously selected a resource in slot n+1 for transmission (e.g., using a resource selection procedure) and was also made aware of the COT 1606 initiated by first sidelink UE 1602 (e.g., based on the SCI transmission in the one or more sidelink transmissions 1608), which includes slot n+1. Accordingly, the second sidelink UE 1610 may proceed to perform one or more sidelink transmissions 1614 in slot n+1. Further, because the one or more sidelink transmissions 1614 are transmitted within slot n+1, which is included within the COT 1606, and because the COT has been continuously utilized up to slot n+1, the second sidelink UE 1610 may not need to perform a category 4 LBT procedure.

Similarly, the third sidelink UE 1612 may become aware of the COT 1606 (e.g., based on the SCI transmission in the one or more sidelink transmissions 1608) and may have previously selected slot n+3 to perform transmissions, which, as illustrated, is also included in the COT 1606. However, as illustrated, no transmission occurs within slot n+2 in the COT 1606 and, as a consequence, the COT 1606 may be effectively released. Accordingly, the third sidelink UE 1612 may have to initiate a new COT 1616 for one or more transmissions 1618 by performing a new LBT 1620.

As illustrated in FIG. 16, a shared COT (e.g., COT 1606) may be released due to unutilized slots (e.g., slot n+2), leading to relatively large transmission gaps. Such unutilized slots may occur due the PSFCH in sidelink. For example, certain sidelink slots or portions of sidelink slots may be reserved for PSFCH transmissions. In some cases, if there are no corresponding PSFCH transmissions occurring in these (portions of) slots (e.g., even though resources are reserved), there may be a transmission gap that could lead to a shared COT being released. In other words, since there is no guarantee that a PSFCH transmission occurs over a certain slots or portion of a slots, PSFCH inactivity may result in COT release.

Figures 17A, 17B:
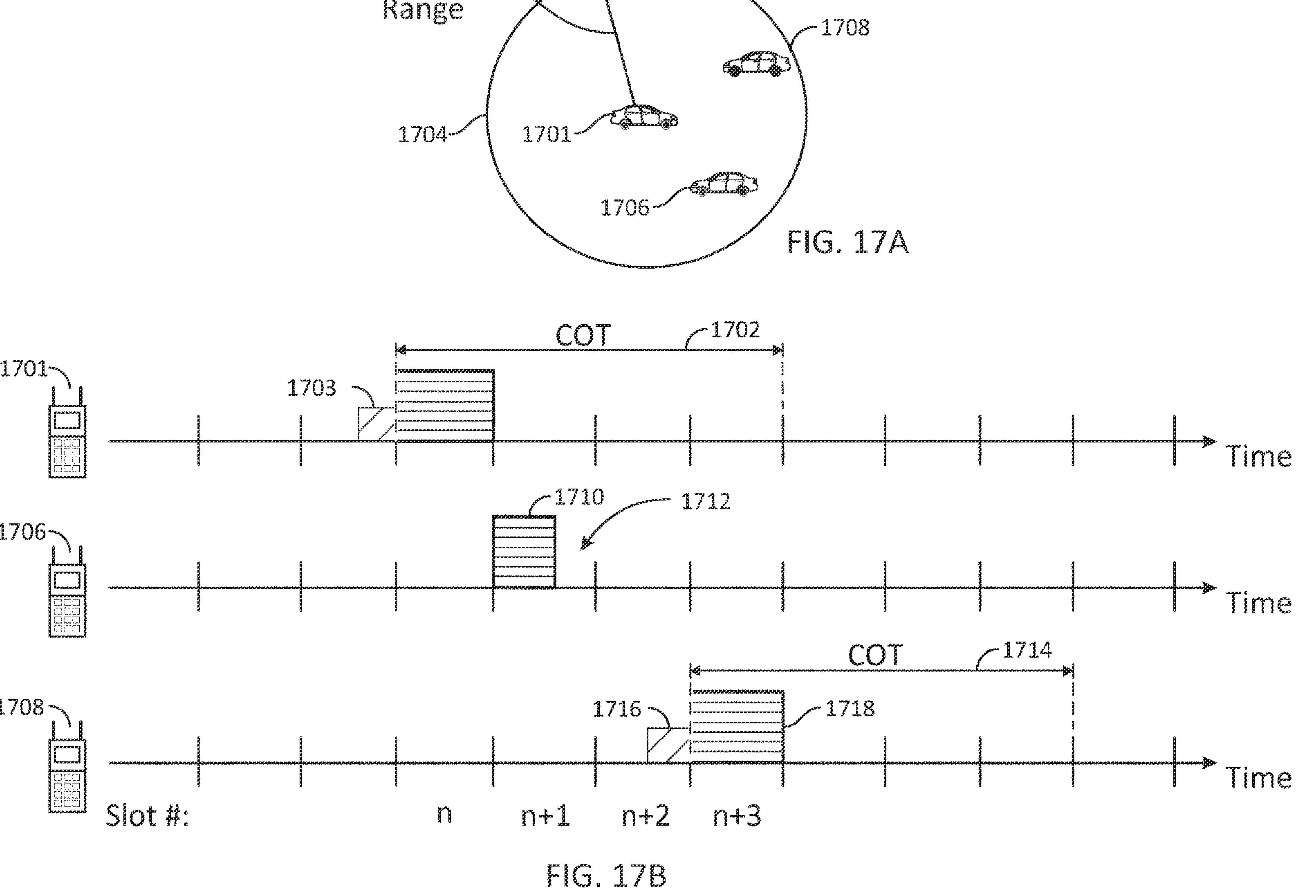
FIGS. 17A and 17B provide an example of COT release due to unutilized physical sidelink frequency channel (PSFCH) slots according to some aspects of the present disclosure.

FIGS. 17A and 17B provide an example of COT release due to unutilized PSFCH slots. As shown in FIGS. 17A and 17B, a first sidelink UE 1701 may initiate a COT 1702 that may have a maximum spatial area 1704, which encompasses a second sidelink UE 1706 and a third sidelink UE 1708. As shown in FIG. 17B, the COT 1702 may have a duration of four slots (e.g., spanning slots n, n+1, n+2, and n+3) and may be initiated by the first sidelink UE 1701 via a LBT procedure 1703 performed in a slot prior to slot n.

As both the second sidelink UE 1706 and third sidelink UE 1708 are within range of the maximum spatial area 1704, both the second sidelink UE 1706 and the third sidelink UE 1708 may utilize the COT 1702 as long as the COT 1702 is active when the second sidelink UE 1706 and the third sidelink UE 1708 are about to transmit. As shown, the second sidelink UE 1706 performs one or more transmissions 1710 right after the first sidelink UE 1701 in slot n+1. However, a portion 1712 of slot n+1 is reserved for PSFCH transmission, meaning that the one or more transmissions 1710 of the second sidelink UE 1706 terminate earlier than the end of the slot n+1. Further, in the example shown in FIG. 17B, it happens that no PSFCH transmission occurs within slot n+1, effectively releasing the COT 1702. As a consequence the third sidelink UE 1708 has to initiate a new COT 1714 (e.g., by performing another LBT 1716) to perform one or more transmissions 1718, whereas the third sidelink UE 1708 could have simply used the COT 1702 if the PSFCH was active over slot n+1.

Accordingly, due to PSFCH inactivity, a COT may last at most N slots (e.g., where N=1, 2, or 4 is the PSFCH period in slots), which reduces the effectiveness of COT sharing since a COT duration allowed by regulation typically spans a few microseconds which includes multiple slots. This issue with PSFCH inactivity and COT sharing is particularly relevant to certain types of sidelink transmissions, such as groupcast option 1 transmissions. For example, groupcast option 1 transmissions are transmissions, transmitted on PSSCH by a transmitter UE to a group of receiver UEs, which only require corresponding acknowledgement feedback to be transmitted by a receiver UE when the receiver UE fails to decode the PSSCH transmission. That is, under groupcast option 1, only negative acknowledgements (NACKs) are permitted to be transmitted when a receiver UE fails to decode a corresponding PSSCH transmission. In other words, under groupcast option 1, acknowledgements (ACKs) are not transmitted by a receiver UE when the receiver UE correctly receives and decodes a corresponding PSSCH transmission. Thus, if a transmission has been correctly decoded by all receiver UEs there will be no corresponding PSFCH transmission, which may cause gaps in transmissions within a COT and, as a consequence, the COT being released. On the other hand, ACK/NACK transmission schemes, such as groupcast option 2 and unicast, will result in feedback transmission (e.g., ACK or NACK) whenever a transmission occurs. Thus groupcast option 2 transmissions and unicast transmissions are inherently more effective in retaining a COT than groupcast option 1 transmissions.

Accordingly, aspects of the present disclosure provide techniques to help reduce the chances a shared COT is inadvertently released when groupcast option 1 sidelink transmissions are used. For example, to avoid inadvertent release of a COT when using groupcast option 1 transmissions, receiver UEs that correctly decode a groupcast option 1 transmission within the COT may proceed with transmitting an ACK. The ACK may comprise a dummy ACK that serves no purpose other than to avoid release of the COT and may be ignored by a transmitter UE (e.g., the UE that transmitted the groupcast option 1 transmission).

For example, in some cases, a first UE may receive a first sidelink groupcast transmission that does not require an ACK to be transmitted when the first sidelink groupcast transmission is successfully decoded by the first UE. The first sidelink groupcast transmission may include a sidelink groupcast option 1 transmission on a PSSCH in an unlicensed spectrum. In some cases, the first sidelink groupcast transmission may be received within a COT that was initiated by a second UE. In some cases, even though the COT was initiated by the second UE, the COT may be shared with the first UE for transmissions performed by the first UE. Additionally, in some cases, the first sidelink groupcast transmission may be received by the first UE from the second UE or some other UE utilizing the COT for transmission.

Accordingly, in response to receiving the first sidelink groupcast transmission, the first UE may transmit an ACK for the first sidelink groupcast transmission during the COT initiated by the second UE. In some cases, the first sidelink groupcast transmission may be received in a first slot corresponding to a PSSCH and the ACK may be transmitted in a second slot corresponding to a PSFCH. Further, in some cases, the first UE may transmit the ACK before a threshold amount of time, corresponding to a maximum duration of the COT, after receiving the first sidelink groupcast transmission. As noted above, by transmitting the ACK during the COT (e.g., before the threshold amount of time), the first UE may delay release of the COT (e.g., which would have normally been released due to no feedback being transmitted when the first sidelink groupcast transmission is successfully received and decoded).

In some cases, the unlicensed spectrum in which the first sidelink groupcast transmission is received may be shared with other radio access technologies and other devices. Accordingly, to ensure fairness to the other technologies and devices operating in the unlicensed spectrum, transmitting the ACK for the first sidelink groupcast transmission may be conditioned on one or more criterion. By conditioning the transmission of the ACK on the one or more criterion, it can be ensured that the first UE does not needlessly extend the COT and take resources away from the other technologies and devices in the unlicensed spectrum which are not otherwise being substantively used. More specifically, such conditioning may avoid devices transmitting ACK feedbacks all of the time, which may overload the PSFCH and could result in an aggressive channel access that may not be allowed by regulation.

For example, the one or more criterion may include a criterion that devices (e.g., sidelink UEs) only ACK an actual sidelink groupcast option 1 transmission. If there was no sidelink groupcast option 1 transmission on PSSCH corresponding to a given PSFCH slot, no ACK may be sent over that PSFCH slot. In other words, if the first UE does not first receive a sidelink groupcast option 1 transmission within a COT, the first UE may not transmit an ACK in a PSFCH slot to delay release of the COT.

Further, in some cases, the one or more criterion may include a criterion that the transmission of the ACK must be for or within the COT that the first UE is interested using to perform transmissions. In other words, the first UE may transmit the ACK within the COT when the first UE is interested in using the COT for one or more other transmissions.

In some cases, the one or more criterion may include a criterion that the first UE is within a maximum spatial feedback range of a PSSCH sidelink groupcast transmission to which the ACK corresponds. In other words, the first UE may transmit the ACK when the first UE is within a maximum spatial feedback range associated with the first sidelink groupcast transmission. For example, with reference to FIG. 17A, if the first UE (e.g., second sidelink UE 1706 or third sidelink UE 1708) is within the maximum spatial area 1704, the first UE is permitted to transmit the ACK. However, if the first UE is outside of the maximum spatial area 1704, the first UE may refrain from transmitting an ACK.

In some cases, the one or more criterion may include a criterion that the first UE may transmit the ACK when the first UE intends to perform one or more transmissions (e.g., has a schedule transmission to perform) within the COT in which the first sidelink groupcast transmission (e.g., transmitted by the second UE or some other UE) is received. If the first UE does not intend to transmit within the COT, the first UE should not transmit an ACK to try to keep the COT alive (e.g., to try to delay release of the COT).

In some cases, the one or more criterion may include a criterion that the first UE may transmit the ACK when the first UE does not already have other feedback information to second during the COT, such as a NACK for a groupcast option 1 PSSCH or an ACK/NACK to a groupcast option 2 or unicast transmission. If the first UE does have other feedback to send during the COT, this other feedback transmission may be sufficient to avoid release of the COT and, thus, there is no need to unnecessarily load the PSFCH with a dummy ACK.

In some cases, the one or more criterion may include a criterion that the first UE may transmit the ACK within a particular PSFCH feedback slot included in the COT. For example, in some cases, the first UE may receive an indication specifying one or more feedback slots in the COT in which the ACK may be transmitted. In such cases, the first UE may transmit the ACK within a feedback slot when the feedback slot is included within the specified one or more feedback slots. For example, in some cases, the UE may receive an indication that the (dummy) ACK may be transmitted within a first or second feedback slot included within the COT. Accordingly, based on the indication, the UE may only transmit the ACK within the first or second feedback slot included within the COT and may refrain from transmitting the ACK within any subsequent feedback slots. In some cases, the indication specifying the one or more feedback slots may be obtained from a serving base station, or within SCI from the second UE that initiated the COT, or from pre-configuration information in the UE In some cases, the first UE may receive multiple sidelink groupcast transmissions whose ACKs are expected to be transmitted in a same PSFCH slot. To avoid overloading the PSFCH, there are different options for selecting which of the multiple sidelink group transmissions to transmit a corresponding ACK for. For example, in some cases, the first UE may receive at least a second sidelink groupcast transmission, during the COT, with feedback expected over the same PSFCH slot. In such cases, the first UE may decide to transmit only one ACK in response to receiving the first sidelink groupcast transmission and the second sidelink groupcast transmission. Transmitting only one ACK may be sufficient to delay release of the COT.

In some cases, the first UE may select between the first sidelink groupcast transmission and the second sidelink groupcast transmission to transmit an ACK for. For example, in some cases, the UE may transmit the ACK according to a selection rule associated with multiple UEs, including the first UE. In such cases, the selection rule may specify that, for all UEs of the multiple UEs that received both the first sidelink groupcast transmission and the second sidelink groupcast transmission, the ACK is to be transmitted for one of the first sidelink groupcast transmission in feedback resources associated with the first sidelink groupcast transmission or the second sidelink groupcast transmission in feedback resources associated with the second sidelink groupcast transmission. In other words, the selection rule may specify which of the first sidelink groupcast transmission or the second sidelink groupcast transmission to transmit the ACK for, for example, to avoid multiple ACKs being transmitted and overloading the PSFCH. While the example above involves the selection between two sidelink groupcast transmissions to transmit an ACK for, it should be understood that the first UE may receive more than two sidelink group cast transmissions and may select which sidelink groupcast transmission, of the more-than-two sidelink groupcast transmissions, to transmit the ACK for.

Figure 18:
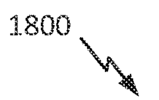
FIG. 18 is a flow diagram illustrating example operations for wireless communication by a first user equipment (UE) according to some aspects of the present disclosure.

FIG. 18 is a flow diagram illustrating example operations 1800 for wireless communication, for example, for improved COT sharing for sidelink unlicensed operation, in accordance with certain aspects of the present disclosure. The operations 1800 may be performed, for example, by a first UE (e.g., the UE 920*a* in the wireless communication network 900). The operations 1800 may be implemented as software components that are executed and run on one or more processors (e.g., controller/processor 1080 of FIG. 10). Further, the transmission and reception of signals by the UE in operations 1800 may be enabled, for example, by one or more antennas (e.g., antennas 1052 of FIG. 10). In certain aspects, the transmission and/or reception of signals by the UE may be implemented via a bus interface of one or more processors (e.g., controller/processor 1080) obtaining and/or outputting signals.

The operations 1800 may begin, at block 1802, by receiving a first sidelink groupcast transmission that does not require an acknowledgement (ACK) to be transmitted when the first sidelink groupcast transmission is successfully decoded.

Operations 1800 may continue, at block 1804, by transmitting, in response to receiving the first sidelink groupcast transmission, the ACK for the first sidelink groupcast transmission during a channel occupancy time (COT) initiated by a second UE to delay release of the COT.

In some cases, transmitting the ACK in block 1804 comprises transmitting the ACK when the first sidelink groupcast transmission, corresponding to the ACK, is received in the COT.

In some cases, transmitting the ACK in block 1804 comprises transmitting the ACK when the first UE is within a maximum spatial feedback range associated with the first sidelink groupcast transmission.

In some cases, transmitting the ACK in block 1804 comprises transmitting the ACK when the first UE has a scheduled transmission to perform that falls within the COT.

In some cases, transmitting the ACK in block 1804 comprises transmitting the ACK when the first UE does not have other feedback information to send during the COT.

In some cases, operations 1800 may further include obtaining an indication specifying one or more feedback slots in the COT in which feedback information may be transmitted. In such cases, transmitting the ACK in block 1804 comprises transmitting the ACK within a feedback slot when the feedback slot is included within the specified one or more feedback slots. In some cases, the indication specifying the one or more feedback slots is obtained from a serving base station, in sidelink control information (SCI) from the second UE, or from pre-configuration information in the UE.

In some cases, operations 1800 may further include receiving a second sidelink groupcast transmission during the COT. In such cases, transmitting the ACK in block 1804 comprises transmitting only one ACK in response to receiving the first sidelink groupcast transmission and the second sidelink groupcast transmission. Further, in some cases, transmitting the ACK in block 1804 comprises transmitting the ACK according to a selection rule associated with multiple UEs, including the first UE. In some cases, the selection rule specifies, for all UEs of the multiple UEs that received both the first sidelink groupcast transmission and the second sidelink groupcast transmission, that the ACK is to be transmitted for the first sidelink groupcast transmission in feedback resources associated with the first sidelink groupcast transmission.

In some cases, the first sidelink groupcast transmission is received in a first slot corresponding to a physical sidelink shared channel (PSSCH) and the ACK is transmitted in a second slot corresponding to a physical sidelink feedback channel (PSFCH).

Further, in some cases, transmitting the ACK in block 1804 comprises transmitting the ACK before a threshold amount of time, corresponding to a maximum duration of the COT, after receiving the first sidelink groupcast transmission.

Figure 19:
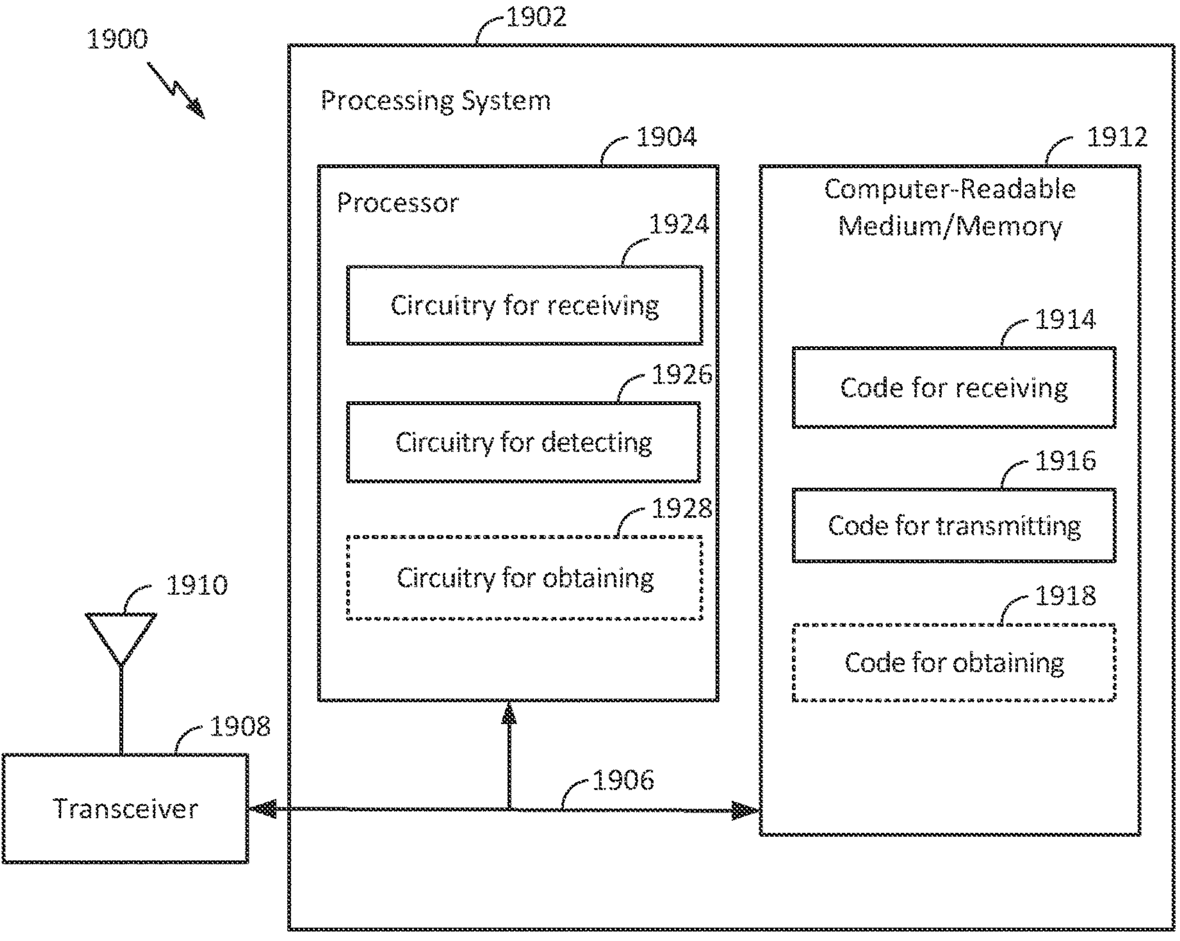
FIG. 19 illustrates a communications device that may include various components configured to perform operations for the techniques disclosed herein according to some aspects of the present disclosure.

FIG. 19 illustrates a communications device 1900 that may include various components (e.g., corresponding to means-plus-function components) configured to perform operations for the techniques disclosed herein, such as the operations illustrated in FIG. 18. The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer-executable code) that when executed by the processor 1904, cause the processor 1904 to perform the operations illustrated in FIG. 18, or other operations for performing the various techniques discussed herein for improved COT sharing for sidelink unlicensed operation. In certain aspects, computer-readable medium/memory 1912 stores code 1914 for receiving, code 1916 for transmitting, and code 1918 for obtaining.

In some cases, the code 1914 for receiving may include code for receiving a first sidelink groupcast transmission that does not require an acknowledgement (ACK) to be transmitted when the first sidelink groupcast transmission is successfully decoded.

In some cases, the code 1916 for transmitting may include code for transmitting, in response to receiving the first sidelink groupcast transmission, the ACK for the first sidelink groupcast transmission during a channel occupancy time (COT) initiated by a second UE to delay release of the COT.

In some cases, the code 1916 for transmitting may include code for transmitting the ACK when the first sidelink groupcast transmission, corresponding to the ACK, is received in the COT.

In some cases, the code 1916 for transmitting may include code for transmitting the ACK when the first UE is within a maximum spatial feedback range associated with the first sidelink groupcast transmission.

In some cases, the code 1916 for transmitting may include code for transmitting the ACK when the first UE has a scheduled transmission to perform that falls within the COT.

In some cases, the code 1916 for transmitting may include code for transmitting the ACK when the first UE does not have other feedback information to send during the COT.

In some cases, the code 1918 for obtaining may include code for obtaining an indication specifying one or more feedback slots in the COT in which feedback information may be transmitted.

In some cases, the code 1916 for transmitting may include code for transmitting the ACK within a feedback slot when the feedback slot is included within the specified one or more feedback slots.

In some cases, the code 1914 for receiving may include code for receiving a second sidelink groupcast transmission during the COT.

In some cases, the code 1916 for transmitting may include code for transmitting only one ACK in response to receiving the first sidelink groupcast transmission and the second sidelink groupcast transmission.

In some cases, the code 1916 for transmitting may include code for transmitting the ACK according to a selection rule associated with multiple UEs, including the first UE.

In some cases, the code 1916 for transmitting may include code for transmitting the ACK before a threshold amount of time, corresponding to a maximum duration of the COT, after receiving the first sidelink groupcast transmission.

In certain aspects, the processor 1904 may include circuitry configured to implement the code stored in the computer-readable medium/memory 1912, such as for performing the operations illustrated in FIG. 18, or other operations for performing the various techniques discussed herein for improved COT sharing for sidelink unlicensed operation. For example, the processor 1904 includes circuitry 1924 for receiving, circuitry 1926 for transmitting, and circuitry 1928 for obtaining.

In some cases, the circuitry 1924 for receiving may include circuitry for receiving a first sidelink groupcast transmission that does not require an acknowledgement (ACK) to be transmitted when the first sidelink groupcast transmission is successfully decoded.

In some cases, the circuitry 1926 for transmitting may include circuitry for transmitting, in response to receiving the first sidelink groupcast transmission, the ACK for the first sidelink groupcast transmission during a channel occupancy time (COT) initiated by a second UE to delay release of the COT.

In some cases, the circuitry 1926 for transmitting may include circuitry for transmitting the ACK when the first sidelink groupcast transmission, corresponding to the ACK, is received in the COT.

In some cases, the circuitry 1926 for transmitting may include circuitry for transmitting the ACK when the first UE is within a maximum spatial feedback range associated with the first sidelink groupcast transmission.

In some cases, the circuitry 1926 for transmitting may include circuitry for transmitting the ACK when the first UE has a scheduled transmission to perform that falls within the COT.

In some cases, the circuitry 1926 for transmitting may include circuitry for transmitting the ACK when the first UE does not have other feedback information to send during the COT.

In some cases, the circuitry 1928 for obtaining may include circuitry for obtaining an indication specifying one or more feedback slots in the COT in which feedback information may be transmitted.

In some cases, the circuitry 1926 for transmitting may include circuitry for transmitting the ACK within a feedback slot when the feedback slot is included within the specified one or more feedback slots.

In some cases, the circuitry 1924 for receiving may include circuitry for receiving a second sidelink groupcast transmission during the COT.

In some cases, the circuitry 1926 for transmitting may include circuitry for transmitting only one ACK in response to receiving the first sidelink groupcast transmission and the second sidelink groupcast transmission.

In some cases, the circuitry 1926 for transmitting may include circuitry for transmitting the ACK according to a selection rule associated with multiple UEs, including the first UE.

In some cases, the circuitry 1926 for transmitting may include circuitry for transmitting the ACK before a threshold amount of time, corresponding to a maximum duration of the COT, after receiving the first sidelink groupcast transmission.

Further aspects of the present disclosure include the following:

Aspect 1 includes a method of wireless communication performed by a first user equipment (UE), the method comprising measuring a first reference signal received power (RSRP) of a physical sidelink feedback channel (PSFCH) transmission transmitted during a channel occupancy time (COT) initiated by a second UE; and accessing a first slot of the COT based on the first RSRP.

Aspect 2 includes the method of aspect 1, wherein the PSFCH is transmitted via a second slot reserved for PSFCH transmissions within the COT.

Aspect 3 includes the method of any of aspects 1-2, wherein the RSRP exceeds a RSRP threshold, indicating the transmission of the PSFCH transmission via a second slot of the COT.

Aspect 4 includes the method of any of aspects 1-3, wherein the RSRP threshold is pre-determined.

Aspect 5 includes the method of any of aspects 1-4, further comprising receiving, from a new radio (NR) network to which the first UE is connected, a message indicating the RSRP threshold.

Aspect 6 includes the method of any of aspects 1-5, wherein the message is a radio resource control (RRC) message or a medium access control (MAC)-control element (CE) message.

Aspect 7 includes the method of any of aspects 1-6, wherein the RSRP threshold is computed by the first UE.

Aspect 8 includes the method of any of aspects 1-7, further comprising measuring a second RSRP of an initial transmission transmitted by the second UE after initiating the COT; and adjusting the RSRP threshold based on the second RSRP.

Aspect 9 includes the method of any of aspects 1-8, wherein the RSRP threshold is adjusted to be less than the second RSRP.

Aspect 10 includes the method of any of aspects 1-9, wherein the RSRP threshold is adjusted to be no greater than the second RSRP.

Aspect 11 includes a method of wireless communication performed by a first user equipment (UE), the method comprising detecting a physical sidelink shared channel (PSSCH) transmission; detecting, within a COT having a plurality of slots, a physical sidelink feedback channel (PSFCH) transmission transmitted in response to the PSSCH transmission; and accessing a first slot of the plurality of slots of the COT based on the detecting the PSFCH transmission.

Aspect 12 includes the method of aspect 11, wherein the PSSCH transmission is transmitted via a second slot of the plurality of slots of the COT.

Aspect 13 includes the method of any of aspects 11-12, wherein the PSSCH transmission is a groupcast option 1 PSSCH transmission transmitted via a slot that is not part of the COT.

Aspect 14 includes the method of any of aspects 11-13, wherein the PSFCH transmission includes a hybrid automatic repeat request (HARQ) negative acknowledgement (NACK) message.

Aspect 15 includes the method of any of aspects 11-14, wherein the COT is initiated by a second UE; and the PSFCH transmission is transmitted by one or more third UEs within a feedback range of the second UE.

Aspect 16 includes the method of any of aspects 11-15, wherein the first UE is within the feedback range of the second UE.

Aspect 17 includes a method of wireless communication performed by a first user equipment (UE), the method comprising receiving a first sidelink groupcast transmission that does not require an acknowledgement (ACK) to be transmitted when the first sidelink groupcast transmission is successfully decoded; and transmitting, in response to receiving the first sidelink groupcast transmission, the ACK for the first sidelink groupcast transmission during a channel occupancy time (COT) initiated by a second UE.

Aspect 18 includes the method of aspect 17, wherein transmitting the ACK comprises transmitting the ACK when the first sidelink groupcast transmission, corresponding to the ACK, is received in the COT.

Aspect 19 includes the method of any of aspects 17-18, wherein transmitting the ACK comprises transmitting the ACK when the first UE is within a maximum spatial feedback range associated with the first sidelink groupcast transmission.

Aspect 20 includes the method of any of aspects 17-19, wherein transmitting the ACK comprises transmitting the ACK when the first UE has a scheduled transmission to perform that falls within the COT.

Aspect 21 includes the method of any of aspects 17-20, wherein transmitting the ACK comprises transmitting the ACK when the first UE does not have other feedback information to send during the COT.

Aspect 22 includes the method of any of aspects 17-21, further comprising obtaining an indication specifying one or more feedback slots in the COT in which feedback information may be transmitted, wherein transmitting the ACK comprises transmitting the ACK within a feedback slot when the feedback slot is included within the specified one or more feedback slots.

Aspect 23 includes the method of any of aspects 17-22, wherein the indication specifying the one or more feedback slots is obtained from a serving base station or from preconfiguration information in the UE.

Aspect 24 includes the method of any of aspects 17-23, further comprising receiving a second sidelink groupcast transmission during the COT.

Aspect 25 includes the method of any of aspects 17-24, wherein transmitting the ACK comprises transmitting only one ACK in response to receiving the first sidelink groupcast transmission and the second sidelink groupcast transmission.

Aspect 26 includes the method of any of aspects 17-25, wherein, transmitting the ACK comprises transmitting the ACK according to a selection rule associated with multiple UEs, including the first UE; and the selection rule specifies, for all UEs of the multiple UEs that received both the first sidelink groupcast transmission and the second sidelink groupcast transmission, that the ACK is to be transmitted for the first sidelink groupcast transmission in feedback resources associated with the first sidelink groupcast transmission.

Aspect 27 includes the method of any of aspects 17-26, wherein the first sidelink groupcast transmission is received in a first slot corresponding to a physical sidelink shared channel (PSSCH) and the ACK is transmitted in a second slot corresponding to a physical sidelink feedback channel (PSFCH).

Aspect 28 includes the method of any of aspects 17-27, wherein transmitting the ACK comprises transmitting the ACK before a threshold amount of time, corresponding to a maximum duration of the COT, after receiving the first sidelink groupcast transmission.

Aspect 29 includes a non-transitory computer-readable medium storing one or more instructions for wireless communication, the one or more instructions comprising one or more instructions that, when executed by one or more processors of a first user equipment, cause the one or more processors to perform any one of aspects 1-10.

Aspect 30 includes a non-transitory computer-readable medium storing one or more instructions for wireless communication, the one or more instructions comprising one or more instructions that, when executed by one or more processors of a first user equipment, cause the one or more processors to perform any one of aspects 11-16.

Aspect 31 includes a non-transitory computer-readable medium storing one or more instructions for wireless communication, the one or more instructions comprising one or more instructions that, when executed by one or more processors of a first user equipment, cause the one or more processors to perform any one of aspects 17-28.

Aspect 32 includes a first user equipment (UE) comprising one or more means to perform any one or more of aspects 1-10.

Aspect 33 includes a first user equipment (UE) comprising one or more means to perform any one or more of aspects 11-16.

Aspect 34 includes a first user equipment (UE) comprising one or more means to perform any one or more of aspects 17-28.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method performed by a first user equipment (UE), comprising:

measuring a first reference signal received power (RSRP) of a physical sidelink feedback channel (PSFCH) transmission detected during a channel occupancy time (COT), wherein the first RSRP exceeds a RSRP threshold;

accessing a first slot of the COT based on the first RSRP;

measuring a second RSRP of an initial transmission received from a second UE after initiation of the COT; and adjusting the RSRP threshold, based on the second RSRP, to be less than the second RSRP.

2. The method of claim 1, wherein the PSFCH transmission is detected via a second slot reserved for PSFCH transmissions within the COT.

3. The method of claim 1, wherein the RSRP threshold is pre-determined.

4. The method of claim 1, further comprising:

receiving, from a network node, a message indicating the RSRP threshold.

5. The method of claim 1, further comprising:

determining the RSRP threshold.

6. The method of claim 1, further comprising:

detecting a physical sidelink shared channel (PSSCH) transmission; and detecting, in response to the PSSCH transmission, the PSFCH transmission, wherein the first slot of the COT is accessed based on the detecting of the PSFCH transmission.

7. The method of claim 6, wherein the PSSCH transmission is a groupcast option-1 PSSCH transmission.

8. The method of claim 7, further comprising:

detecting a negative-acknowledgment (NACK) transmission corresponding to the groupcast option-1 PSSCH transmission.

9. A first user equipment (UE), comprising:

one or more antennas; and a processing system that includes one or more processors and one or more memories that store code and are coupled with the one or more processors, the processing system configured to cause the first UE to:

detect a physical sidelink feedback channel (PSFCH) transmission during a channel occupancy time (COT);

measure a first reference signal received power (RSRP) of the PSFCH transmission, wherein the first RSRP exceeds a RSRP threshold;

access a first slot of the COT based on the first RSRP;

measure a second RSRP of an initial transmission received from a second UE after initiation of the COT; and adjust the RSRP threshold, based on the second RSRP, to be less than the second RSRP.

10. The first UE of claim 9, wherein the processing system, to detect the PSFCH transmission, is configured to cause the first UE to:

detect the PSFCH transmission via a second slot reserved for PSFCH transmissions within the COT.

11. The first UE of claim 9, wherein the RSRP threshold is pre-determined.

12. The first UE of claim 9, wherein the processing system is further configured to cause the first UE to:

receive, from a network node, a message indicating the RSRP threshold.

13. The first UE of claim 9, wherein the processing system is further configured to cause the first UE to:

determine the RSRP threshold.

14. The first UE of claim 9, wherein the processing system is further configured to cause the first UE to:

detect a physical sidelink shared channel (PSSCH) transmission;

detect, in response to the PSSCH transmission, the PSFCH transmission; and wherein the processing system, to access the first slot of the COT, is configured to cause the UE to:

access the first slot of the COT based on the detection of the PSFCH transmission.

15. The first UE of claim 14, wherein the PSSCH transmission is a groupcast option-1 PSSCH transmission.

16. The first UE of claim 15, wherein the processing system is further configured to cause the first UE to:

detect a negative-acknowledgment (NACK) transmission corresponding to the groupcast option-1 PSSCH transmission.

17. A non-transitory computer-readable medium storing a set of instructions for wireless communication, the set of instructions comprising:

one or more instructions that, when executed by one or more processors of a first user equipment (UE), cause the first UE to:

detect a physical sidelink feedback channel (PSFCH) transmission during a channel occupancy time (COT);

measure a first reference signal received power (RSRP) of the PSFCH transmission, wherein the first RSRP exceeds a RSRP threshold; and access a first slot of the COT based on the first RSRP;

measure a second RSRP of an initial transmission received from a second UE after initiation of the COT; and adjust the RSRP threshold, based on the second RSRP, to be less than the second RSRP.

18. The non-transitory computer-readable medium of claim 17, wherein the PSFCH transmission is detected via a second slot reserved for PSFCH transmissions within the COT.

19. The non-transitory computer-readable medium of claim 17, wherein the RSRP threshold is pre-determined.

20. The non-transitory computer-readable medium of claim 17, wherein the one or more instructions further cause the first UE to:

receive, from a network node, a message indicating the RSRP threshold.

21. The non-transitory computer-readable medium of claim 17, wherein the one or more instructions further cause the first UE to:

determine the RSRP threshold.

22. The non-transitory computer-readable medium of claim 17, wherein the one or more instructions further cause the first UE to:

detect a physical sidelink shared channel (PSSCH) transmission;

detect, in response to the PSSCH transmission, the PSFCH transmission; and access the first slot of the COT further based on the detecting of the PSFCH transmission.

23. The non-transitory computer-readable medium of claim 22, wherein the PSSCH transmission is a groupcast option-1 PSSCH transmission.

24. The non-transitory computer-readable medium of claim 23, wherein the one or more instructions further cause the first UE to:

detect a negative-acknowledgment (NACK) transmission corresponding to the groupcast option-1 PSSCH transmission.

25. A method performed by a first user equipment (UE), comprising:

receiving a message indicating a reference signal received power (RSRP) threshold;

measuring a first RSRP of a physical sidelink feedback channel (PSFCH) transmission detected during a channel occupancy time (COT), wherein the first RSRP exceeds the RSRP threshold;

accessing a first slot of the COT based on the first RSRP;

measuring a second RSRP of an initial transmission received from a second UE after initiation of the COT; and adjusting the RSRP threshold, based on the second RSRP, to be less than the second RSRP.

26. The method of claim 25, wherein the PSFCH transmission is detected via a second slot reserved for PSFCH transmissions within the COT.

27. The method of claim 25, wherein the message indicating the RSRP threshold is a medium access control (MAC) control element (CE) message.

28. The method of claim 25, further comprising:

detecting a physical sidelink shared channel (PSSCH) transmission; and detecting, in response to the PSSCH transmission, the PSFCH transmission, wherein the first slot of the COT is accessed based on the detecting of the PSFCH transmission.

29. The method of claim 28, wherein the PSSCH transmission is a groupcast option-1 PSSCH transmission.

30. The method of claim 29, further comprising:

detecting a negative-acknowledgment (NACK) transmission corresponding to the groupcast option-1 PSSCH transmission.

* * * * *